US007623260B2

(12) United States Patent
Watanabe et al.

(10) Patent No.: US 7,623,260 B2
(45) Date of Patent: Nov. 24, 2009

(54) IMAGE FORMING APPARATUS AND IMAGE FORMING METHOD

(75) Inventors: Ryoji Watanabe, Kanagawa (JP);
Akihiko Takada, Kanagawa (JP);
Masayoshi Sakakibara, Kanagawa (JP);
Hajime Kishimoto, Kanagawa (JP);
Yasuo Horino, Tokyo (JP); Toshiyuki Yano, Kanagawa (JP); Yasuhiro Matsuo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1010 days.

(21) Appl. No.: 10/647,208

(22) Filed: Aug. 26, 2003

(65) Prior Publication Data

US 2004/0046999 A1   Mar. 11, 2004

(30) Foreign Application Priority Data

Aug. 28, 2002  (JP)  ............................. 2002-248788
Jun. 13, 2003   (JP)  ............................. 2003-169621

(51) Int. Cl.
 *G06K 15/00* (2006.01)
 *H04N 1/00* (2006.01)
 *H04N 1/387* (2006.01)
(52) U.S. Cl. ...................... 358/1.18; 358/1.17; 358/401; 358/450
(58) Field of Classification Search ................. 358/1.16
See application file for complete search history.

(56) References Cited

U.S. PATENT DOCUMENTS 5,995,712 A * 11/1999 Doi ............................ 358/1.2

| 6,585,154 | B1 * | 7/2003  | Ostrover et al.   | 235/375  |
|-----------|------|---------|-------------------|----------|
| 7,048,194 | B2 * | 5/2006  | Minami et al.     | 235/492  |
| 7,081,965 | B2 * | 7/2006  | Taniguchi         | 358/1.15 |
| 2002/0051161 | A1 * | 5/2002 | Kanazawa et al.  | 358/1.12 |
| 2002/0170973 | A1 * | 11/2002| Teraura          | 235/492  |
| 2005/0141001 | A1 * | 6/2005 | Watanabe         | 358/1.9  |
| 2005/0141003 | A1 * | 6/2005 | Yamamoto et al.  | 358/1.12 |
| 2005/0141004 | A1 * | 6/2005 | Kiwada           | 358/1.12 |
| 2005/0141009 | A1 * | 6/2005 | Kiwada           | 358/1.14 |

FOREIGN PATENT DOCUMENTS

| JP | A-9-150563   | 6/1997  |
| JP | A-10-143414  | 5/1998  |
| JP | A 2000-285203| 10/2000 |
| JP | A 2001-134672| 5/2001  |
| JP | A 2001-148000| 5/2001  |
| JP | A 2001-229199| 8/2001  |
| JP | A 2001-260580| 9/2001  |
| JP | A 2001-283011| 10/2001 |

OTHER PUBLICATIONS http://pcweb.mycom.co.jp/news/2001/07/05/22.html.

* cited by examiner

*Primary Examiner*—Mark K Zimmerman
*Assistant Examiner*—Mesfin Getaneh
(74) *Attorney, Agent, or Firm*—Oliff & Berridge, PLC

(57) ABSTRACT

When two or more sheets of images, which have been read from two or more sheets of originals are printed on a single sheet of first printing paper, original information related to the originals is stored into an IC chip attached to the first printing paper. Thereafter, when a user desires to reproduce the originals by using this first printing paper, the original information stored in the IC chip is read therefrom. Based on the read original information, the images read from the originals are printed respectively in the same sizes as those of the respective originals.

9 Claims, 18 Drawing Sheets

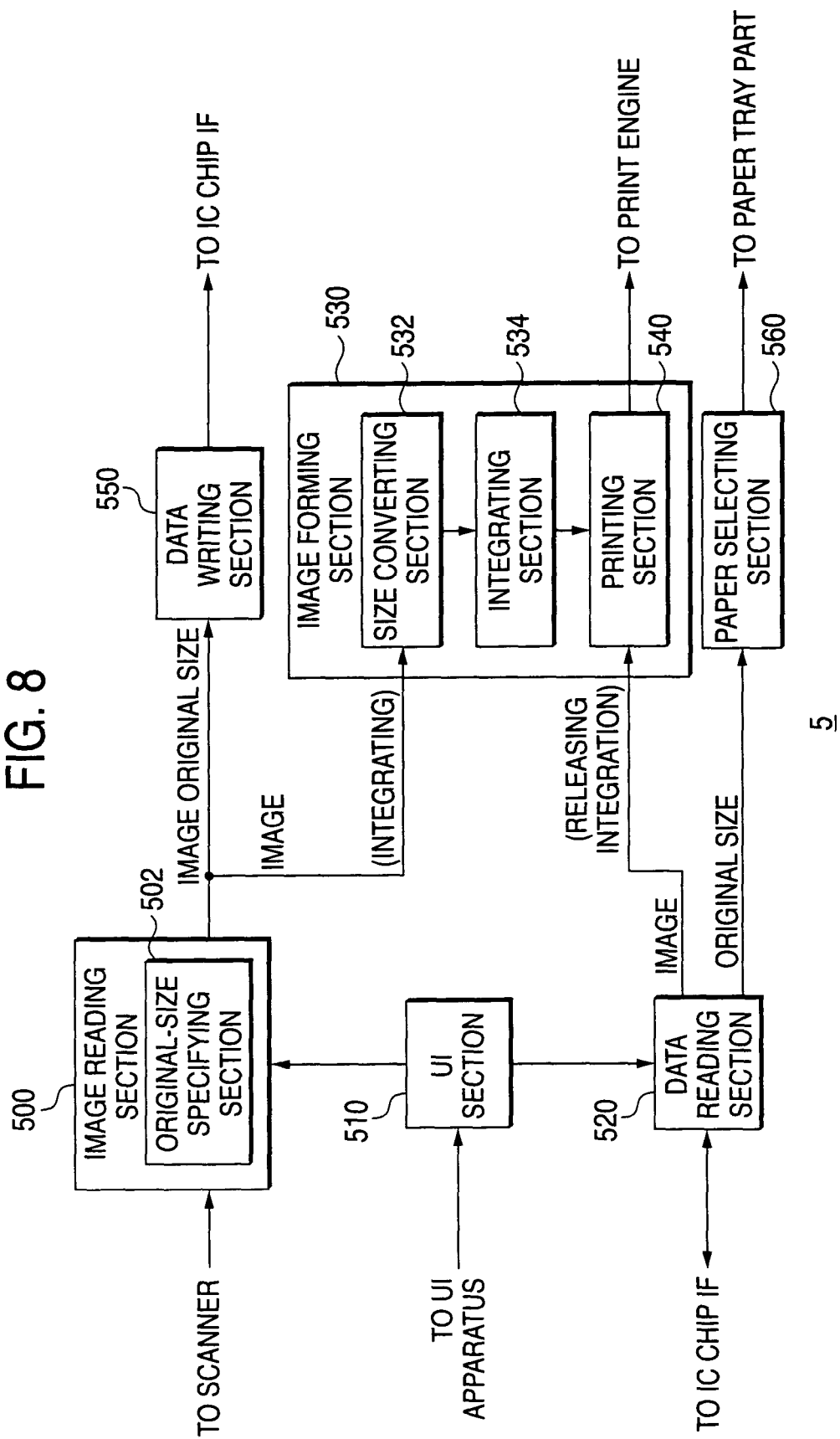

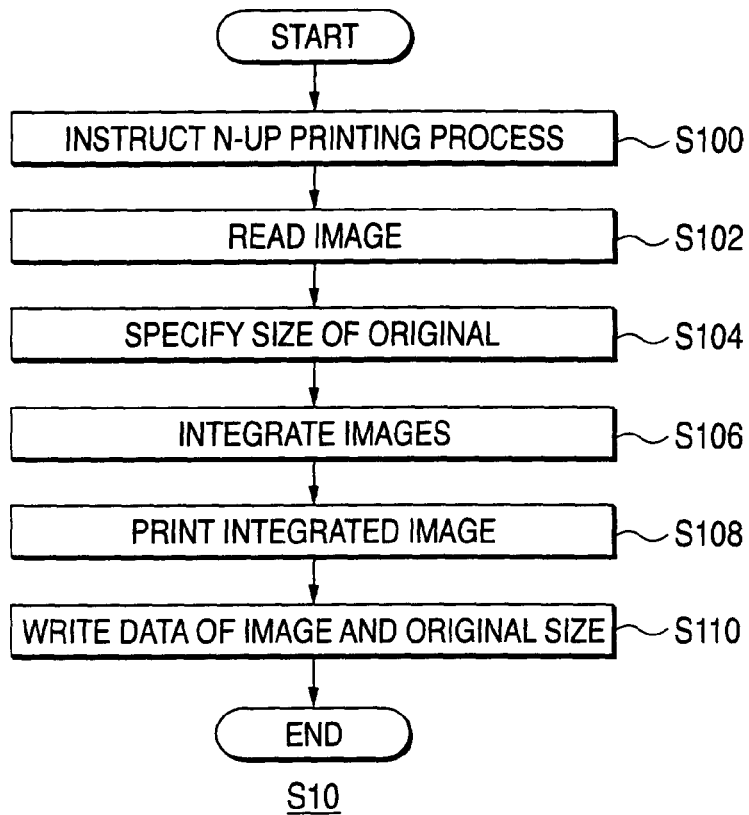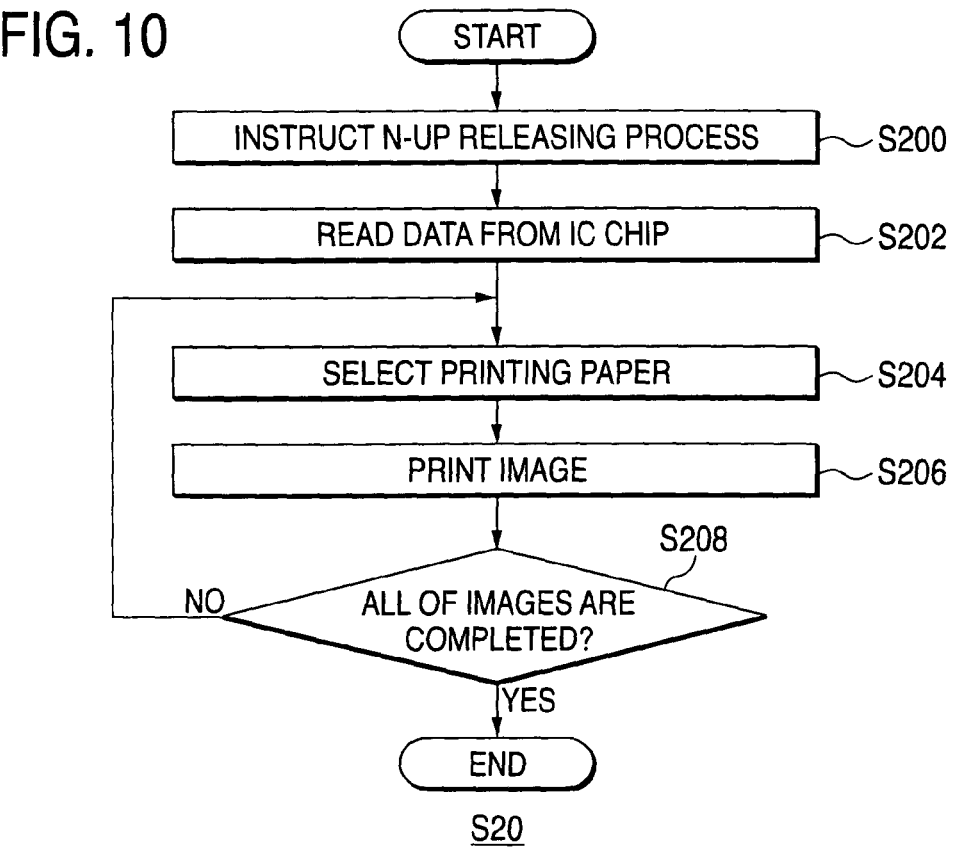

FIG. 11

| LAYOUT DATA |
| :---: |
| X: 50<br>Y: 25, 50, 75 |
| PAPER SIZE |
| COMPRESSION MAGNIFICATION POWER |

| PAPER SIZE STANDARD | A3 | A4 | A5 |
|---|---|---|---|
| A3 | 1:1 | 2:1 | 4:1 |
| A4 | 1:2 | 1:1 | 2:1 |
| A5 | 1:4 | 1:2 | 1:1 |

IMAGE FORMING APPARATUS AND IMAGE FORMING METHOD

The present disclosure relates to the subject matter contained in Japanese Patent Application No. 2002-248788; filed on Sep. 28, 2002 and Japanese Patent Application No. 2003-169621 filed on Jun. 13, 2003, which are incorporated herein by reference in its entirety.

BACKGROUND OF THE INVENTION

1. Field of the Invention

The present invention relates to an image forming system and an image forming method, which integrate or separate images to form a desirable image using a non-contact memory attached to an original.

2. Description of the Related Art

A compact semiconductor chip (for example, μ-chip by HITACHI, LTD.) from which an external unit can read stored data in a non-contact manner has been known.

Also, JP-A-2001-229199, JP-A-2000-285203, JP-A-2001-134672, JP-A-2001-283011, JP-A-2001-148000, and JP-A-2001-260580 disclose applications of the compact semiconductor chip.

SUMMARY OF THE INVENTION

The present invention has been made from the viewpoint of the technical background, and has an object to provide an image forming system and an image forming method, which integrate or separate images to form a desirable image using a non-contact memory attached to an original.

[Image Forming System]

To achieve the above described object, according to a first aspect of the invention, an image forming system includes a first image forming member having a data storage unit and an image forming apparatus for forming an image on at least the first image forming member. The image forming apparatus includes an image reading unit for reading images, which are printed on originals, respectively, to form image data each indicating the read images, an image forming unit for forming the read images on the single first image forming member; and a data writing unit for writing the image data indicating the images formed on the single first image forming member into the first image forming member. The data storage unit stores the written image data.

Preferably, the image forming system further includes another first image forming member and a second image forming member. The first image forming member further includes a data supply unit for supplying the stored image data to an external. The image forming apparatus further includes a data reading unit for reading the image data supplied from the data supply unit. The image forming unit utilizes the image data read by the data reading unit to form the image corresponding to the image data on one of the another first image forming member and the single second image forming member.

Preferably, a display unit for displaying at least one image using the image data read by the data reading unit is further provided.

Preferably, the image data read by the data reading unit is plural pieces of image data. The image forming apparatus further includes a selecting unit for receiving an operation to select at least one of the plural pieces of image data. The image forming unit forms the image corresponding to the selected image data on the one of the single first image forming member and a single second image forming member.

Also, according to a second aspect of the invention, an image forming system includes a first image forming member having a data storage unit, and an image forming apparatus for forming an image on at least the first image forming member. The image forming apparatus includes an image reading unit for reading images, which are printed on originals, respectively, to form image data each indicating the read images, an image forming unit for forming the read images on a single first image forming member, and a data writing unit for writing layout data indicating positions where the images formed on the single first image forming member are displayed into the first image forming member. The data storage unit stores the written layout data.

Preferably, the first image forming member further includes a data supply unit for supplying the written layout data to an external. The image forming apparatus further includes a data reading unit for reading the layout data from the first image forming member. The image reading unit reads the images formed on the first image forming member. The image forming unit divides the images read from the first image forming member in accordance with the read layout data and forms the divided images on one of another first image forming member and a single second image forming member.

Also, according to a third aspect of the invention, an image forming system includes a first image forming member having a data storage unit, and an image forming apparatus for forming an image on at least the first image forming member. The image forming apparatus includes an image reading unit for reading images, which are printed on originals, respectively, to form image data each indicating the read images, an image forming unit for forming the read images on a single first image forming member, and a data writing unit for writing total number data indicating total number of the images formed on the single first image forming member into the first image forming member. The data storage unit stores the written total number data.

Preferably, the first image forming member further includes a data supply unit for supplying the written total number data to an external. The image forming apparatus further includes a data reading unit for reading the total number data from the first image forming member. The image reading unit reads the images formed on the first image forming member. The image forming unit divides the images read from the first image forming member in accordance with the read total number data and forms the divided images on one of another first image forming member and a single second image forming member.

Preferably, the image forming apparatus further includes an original-size specifying unit for specifying a size of the original. The data writing unit further writes size data into the first image forming member on which these respective images are formed. The size data indicates a size of the original, which constitutes a source of the respective images formed on the single piece of the first image forming member.

Preferably, the data supply unit of the first image forming member further supplies the written size data to the external. The data reading unit of the image forming apparatus reads the size data from the first image forming member. The image forming apparatus further includes a forming member selection unit for selecting an image forming member having size corresponding to the read size data. The image forming unit forms at least part of the read images on the selected image forming member.

Preferably, the image forming unit of the image forming apparatus changes sizes of the read images in a predetermined magnification to form the changed image on a first image forming member. The data writing unit writes magnification data indicating the predetermined magnification into the first image forming member.

Preferably, the data supply unit of the first image forming member further supplies the written magnification data to the external. The data reading unit of the image forming apparatus reads the magnification data from the first image forming member. The image forming unit changes the images read from the first image forming member in accordance with the read magnification data to form changed images on one of another first image forming member and a single second image forming member.

It should be understood that the following description does not limit the technical scope of the invention.

In the image forming system according to the present invention, a process and another process are carried out in response to an instruction of a user. In the first-mentioned process (will be referred to as "N-up printing process" hereinafter), while images are read from two sheets or more sheets of originals, two sheets or more sheets of the read images are integrated with each other and then the integrated image is printed on a single sheet of printing paper (first image forming member). In the last-mentioned process (will be referred to as "N-up turning back process" hereafter), while images are read from such a printing paper on which two sheets or more sheets of images have been displayed, these two sheets, or more sheets of images are printed respectively on a printing paper (either first image forming member or second image forming member) so as to reproduce an original.

It should be noted that an "N-up printing operation" implies such a printing operation that "N" sheets of images are integrated to each other to be printed on a single sheet of printing paper, whereas an "N-up turning back operation" implies such a printing operation that "N" sheets of images are separately printed by using an "N-up-printed printing paper."

Information which is required to reproduce an original is stored into a semiconductor chip (data storage unit) from which data can be read in a non-contact manner by using electromagnetic waves.

The information which is required to reproduce the original corresponds to, for instance, image data of respective images which are read from two or more sheets of images; layout data indicating positions where the respective images of the originals are printed out; total number data representative of a total number of printed images; size data indicating sizes (dimensions) of the originals; or magnification data indicating compression magnification power when N-up printing operation is carried out.

The semiconductor chip into which these data have been stored is attached to a printing paper in an embedding manner.

The image forming apparatus corresponds to, for example, such a copy machine in which images are read from the above-described originals by employing a scanner (image reading unit), and then, the read images are printed (image forming operation).

In the above-explained N-up printing process, the data writing unit writes the information required to reproduce the original into the semiconductor chip by employing electromagnetic waves by way of such an antenna which is arranged in the vicinity of the printing paper.

In the above-explained N-up printing process, the data reading unit reads the information required to reproduce the original from the semiconductor chip by employing electromagnetic waves by way of such an antenna which is arranged in the vicinity of the printing paper.

The original size specifying unit specifies a size (for example, A3-size, or A4-size) of an original.

The image-forming-member selecting unit selects such a printing paper (for instance, A3-sized paper, or A4-sided paper) having the same size as that of the original by using the information read from the semiconductor chip.

In the N-up printing process, the image forming unit converts the sizes, or changes the layouts in order that two or more sheets of images can be printed on a single sheet of printing paper, and then prints these images on a single sheet of the printing paper (first image forming member).

Also, in the N-up turning back process, the image forming unit restores two or more sheets of images which have been printed on a single sheet of an original to obtain the respective original sizes thereof, and then prints the restored images on either a printing paper (first image forming member) to which the semiconductor chip has been attached or another printing paper (second image forming member) to which the semiconductor chip is not attached.

[Image Forming Apparatus/Image Forming Member]

Also, an image forming apparatus and an image forming member according to the invention, correspond to any one of the above-described image forming apparatus and image forming members employed in the image forming systems.

[Image Forming Method]

According to a fourth aspect of the invention, an image forming method includes reading images, which are printed on originals, respectively, to form image data each indicating the read images, forming the read images on the single first image forming member, and writing the image data indicating the images formed on the single first image forming member into the first image forming member.

[Program]

According to a fifth aspect of the invention, a program makes a computer execute a process including reading images, which are printed on originals, respectively, to form image data each indicating the read images, forming the read images on the single first image forming member, and writing the image data indicating the images formed on the single first image forming member into the first image forming member.

BRIEF DESCRIPTION OF THE DRAWINGS

FIG. 8 is a diagram for representing a structure of a first printing program 5 which is executed by the control apparatus (FIGS. 1 and 2) so as to realize the image forming method according to the present invention.

FIG. 9 is a flow chart for describing a first operation (S10) of the copying apparatus (first printing program 5) in an N-up printing process.

FIG. 10 is a flow chart for explaining a first operation (S20) of the copying apparatus (first printing program 5) in an N-up turning back process.

FIG. 11 is a diagram for exemplifying layout data and the like, which are stored in the IC chip shown in FIG. 3A and FIG. 4A.

DETAILED DESCRIPTION OF THE PREFERRED EMBODIMENT

First Embodiment

A first embodiment of the present invention will now be explained.

Figure 1:
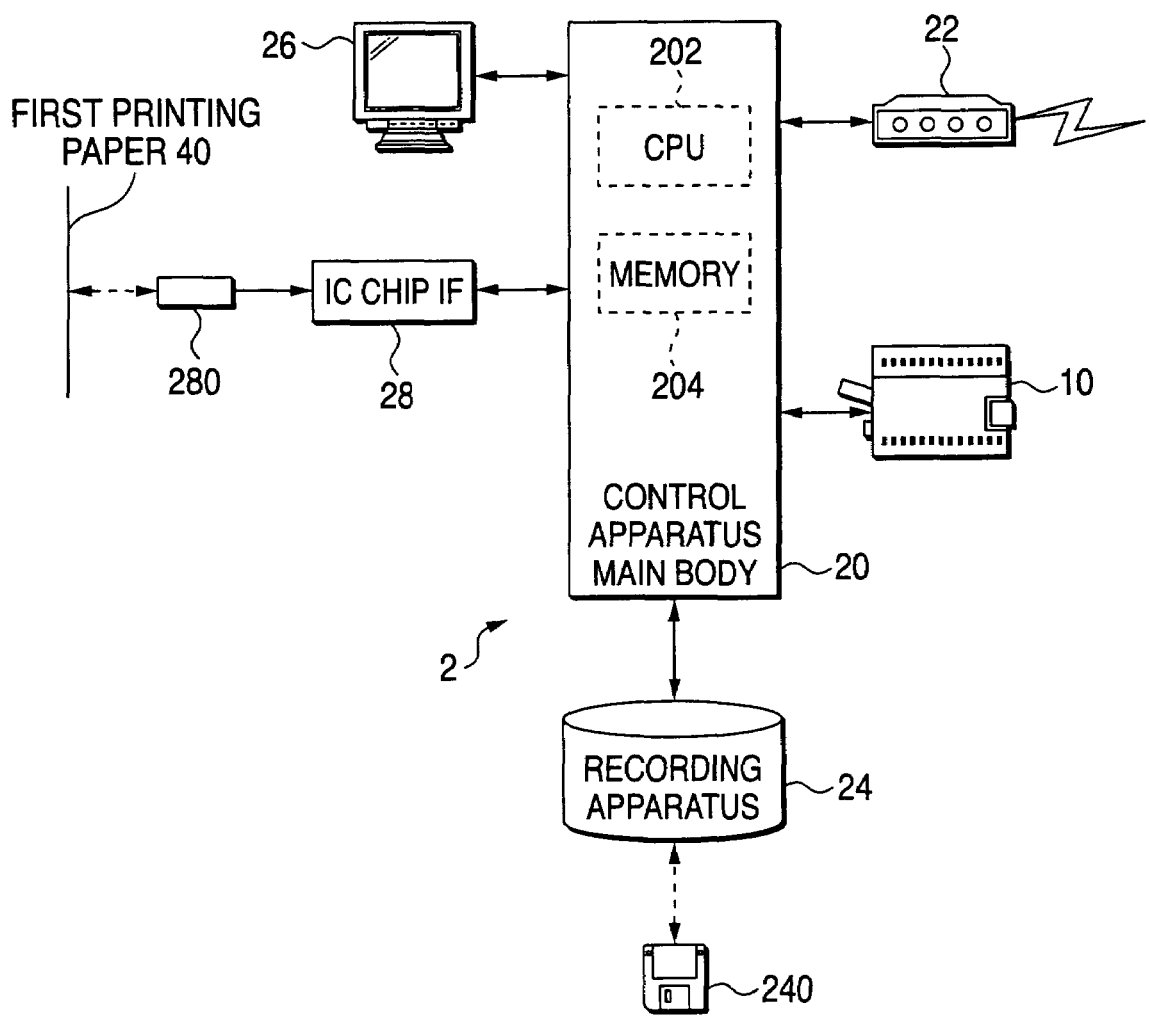
FIG. 1 is a diagram for representing a hardware structure of a copying apparatus to which an image forming method according to the present invention is applied, i.e., for mainly exemplifying a control apparatus thereof.

FIG. 1 is a diagram for showing an example of a hardware structure of a copying apparatus 1 to which an image forming method according to the invention is applied, in which a control apparatus 2 of the copying apparatus 1 is mainly illustrated.

As shown in FIG. 1, the copying apparatus 1 includes the control apparatus 2 and a copying apparatus main body 10.

The control apparatus 2 includes a control apparatus main body 20, a communication apparatus 22, a recording apparatus 24 such as an HDD/CD apparatus, a user interface apparatus (UI apparatus) 26, and an IC chip interfaces (IC chip IF) 28. The control apparatus main body 20 contains a CPU 202, a memory 204, and the like. The user interface apparatus 26 contains either an LCD display apparatus or a CRT display apparatus, and a keyboard/touch panel, and so on. The IC chip interface 28 contains an antenna 280.

[Copying Apparatus Main Body 10]

Figure 2:
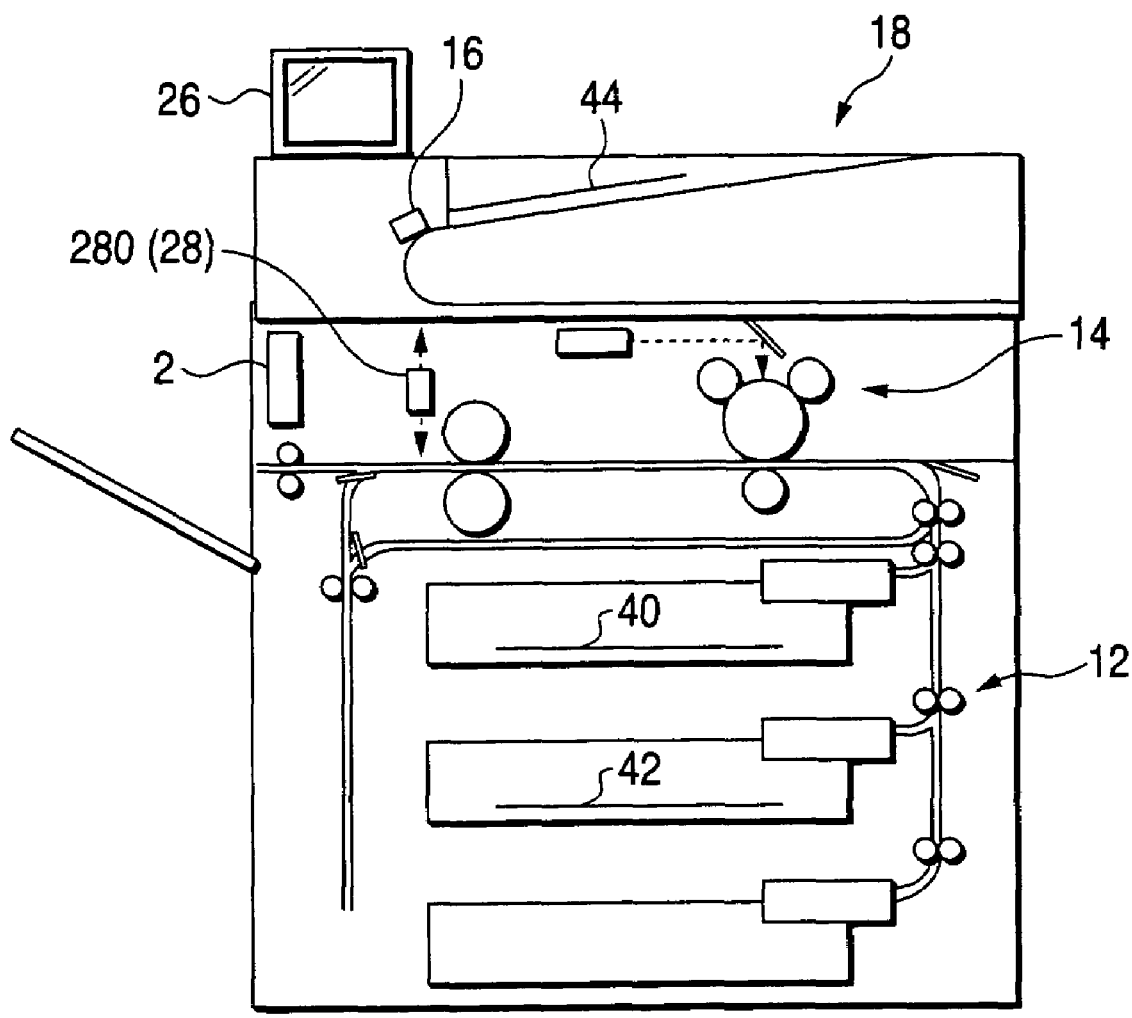
FIG. 2 is a diagram for exemplifying a hardware construction of a copying apparatus main body indicated in FIG. 1.

FIG. 2 is a diagram for showing an example of a hardware structure of the copying apparatus main body 10 shown in FIG. 1.

As shown in FIG. 2, the copying apparatus main body 10 includes a paper tray part 12, a print engine 14, a scanner 16, an original feeding apparatus 18, and the like. The print engine 14 prints images on printing papers by way of the xerography technique and the like. The scanner 16 reads an image of an original. The original feeding apparatus 18 feeds the original.

Also, in the copying apparatus main body 10, the IC chip IF 28 and the antenna 280 are arranged in the vicinity of an original feeding path of the original feeding apparatus 18, through which the original is transported, and also, are arranged in the vicinity of a printing paper transport path through which the printing papers are transported after the printing operations. Also, the UI (user interface) apparatus 26 is arranged at an upper portion of the copying apparatus main body 10.

In other words, the. copying apparatus 1 may be realized by employing such a hardware structure that the IC chip IF 28 and the antenna 280 are additionally provided in a general-purpose copying apparatus, which reads the image of the original transported by the original feeding apparatus 18 to print it.

It should be noted that as shown in FIG. 2, the control apparatus 2 (see FIG. 1) is actually stored inside the copying apparatus main body 10.

[Original Document 44/First Printing Paper 40/Second Printing Paper 42]

Next, a print result obtained in a case where either an N-up printing process or an N-up turning back process is carried out will now be explained with reference to a specific example.

In the below-mentioned descriptions, an original, an image of which is read in the N-up printing process, is assumed as an "original document 44", whereas an image forming member on which two or more images read from two or more sheets of original documents 44 are printed together is assumed as a "first printing paper 40". Also, the "first printing paper 40" also serve as an original whose image is read in the N-up turning back process. An image forming member on which each of two or more images read from this first printing paper 40 is printed is assumed as a "second printing paper 42".

Figure 3A:
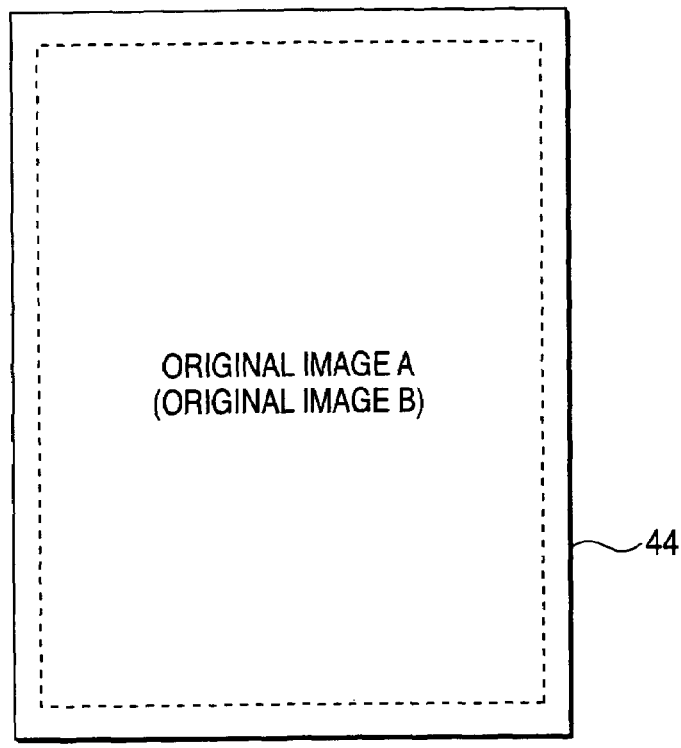
FIG. 3A is a diagram for exemplifying original documents which are employed as an original in an N-up printing process.
Figure 3B:
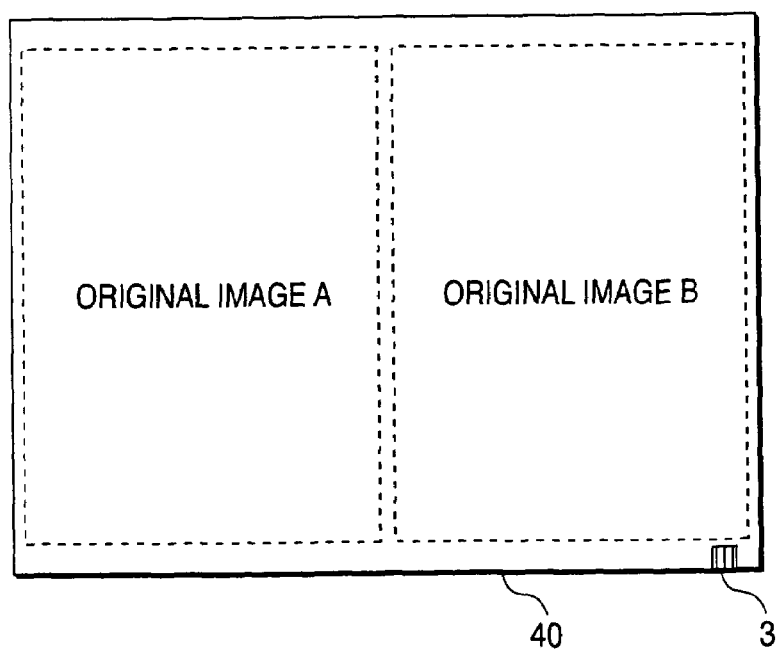
FIG. 3B is a diagram for exemplifying a first printing paper which is obtained by printing two sheets of the original documents shown in FIG. 3A in a 2-up printing mode by the copying apparatus (FIGS. 1 and 2).

FIG. 3A is a diagram for showing an example of the original document 44, which is employed as an original in an N-up printing process. FIG. 3B is a diagram for showing an example of one sheet of first printing paper 40, which is obtained by printing the original document 44 shown in FIG. 3A in a 2-up printing operation by the copying apparatus 1 (FIGS. 1 and 2).

As shown in FIG. 3A, an original image "A" and an original image "B" are displayed on two sheets of the original documents 44, respectively.

As shown in FIG. 3B, an IC chip 3 has been attached to the first printing paper 40 by way of an embedding method, or the like.

The original image "A" read from a first sheet of original document 44, and the original image "B" read from a second sheet of original document 44 have been printed on a surface of the first printing paper 40.

Since a size of the first printing paper 40 and that of the original document 44 in this example correspond to A4-sized papers, the copying apparatus 1 (FIGS. 1 and 2) prints the original images "A" and "B" displayed on the first/second sheets of the original documents 44 on the first printing paper 40 by compressing the A4-sizes of the original images A/B into A5-sizes.

Figure 4A:
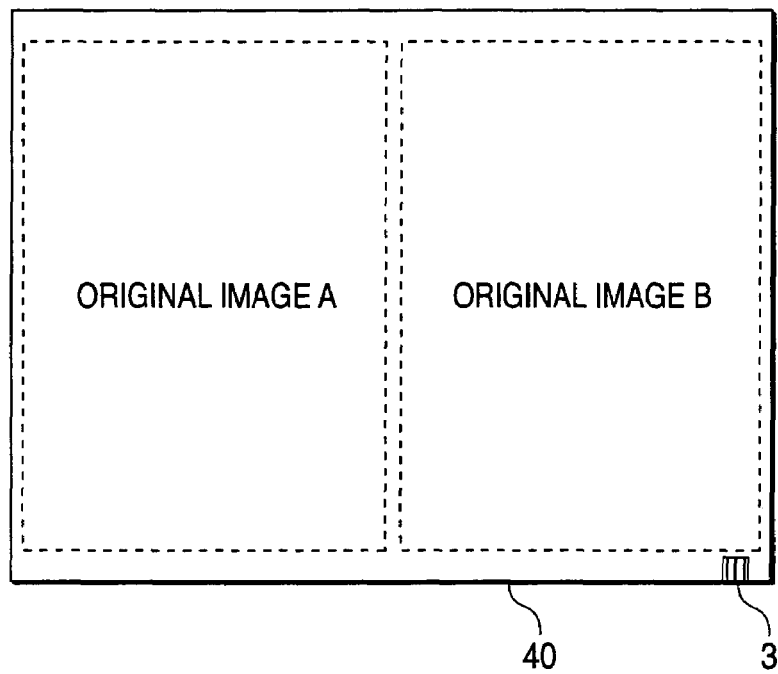
FIG. 4A is a diagram for exemplifying a first printing paper which is employed as an original in an N-up turning back process.
Figure 4B:
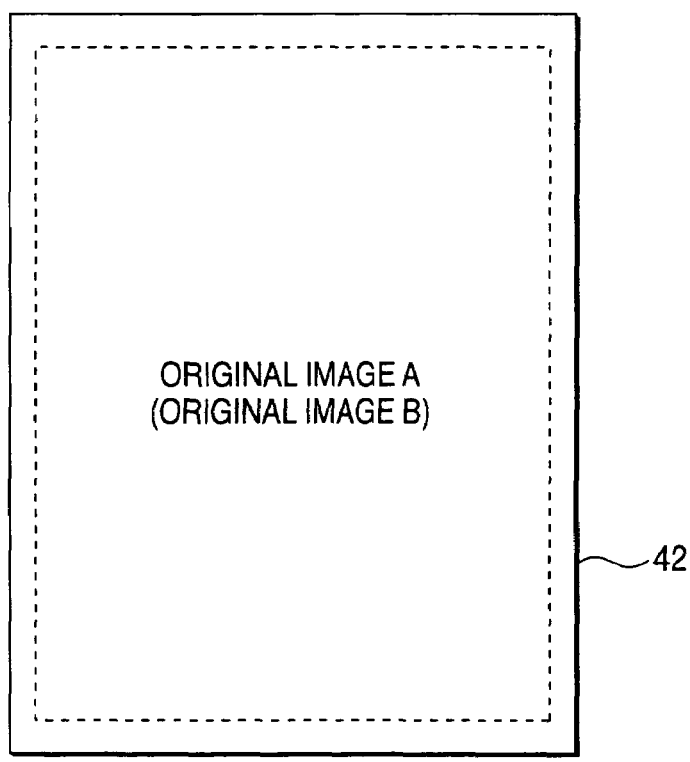
FIG. 4B is a diagram for exemplifying two sheets of second printing papers which are obtained by processing the first printing paper shown in FIG. 4A in a 2-up turning back process by the copying apparatus (FIGS. 1 and 2).

FIG. 4A is a diagram for showing an example of the first printing paper 40, which is employed as an original in the N-up turning back process. FIG. 4B is a diagram for showing an example of two sheets of second printing papers 42, which are obtained by performing a 2-up turning back process with respect to one sheet of the first printing paper 40 shown in FIG. 4A by the copying apparatus 1 (FIGS. 1 and 2).

As shown in FIG. 4A, an original image "A" and another original image "B" are integrated with each other to be printed on the first printing paper 40, which has been printed in an N-up printing operation.

As shown in FIG. 4B, the copying apparatus 1 (FIGS. 1 and 2) executes the N-up turning back process to restore the A5-sizes of the original images "A" and "B", which have been read from the first printing paper 40, to have the same sizes (namely, A4-sizes) as those of the original document 44 (FIG. 3). Then, the copying apparatus 1 prints the restored original images on surfaces of the second printing papers 42.

Also, in a case that the N-up turning back process is carried out in the copying apparatus 1 (FIGS. 1 and 2), the copying apparatus 1 selects the second printing paper 42 having the same paper size as the original document 44.

Figure 5:
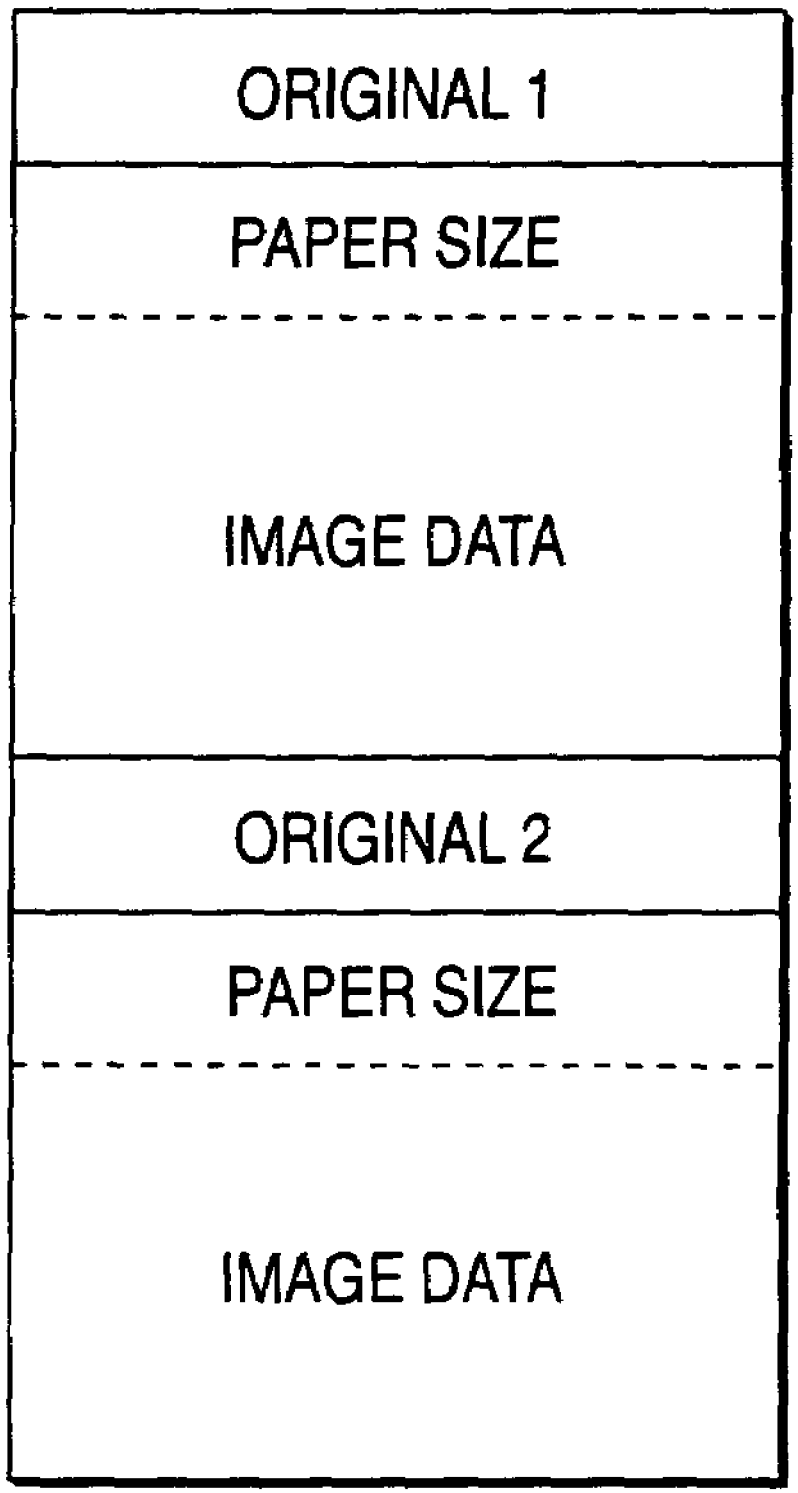
FIG. 5 is a diagram for exemplifying data stored in an IC chip attached to the first printing paper shown in FIG. 4A.

FIG. 5 is a diagram for showing an example of data, which is stored in the IC chip 3 attached to the first printing paper 40 shown in FIG. 3B and FIG. 4A.

As shown in FIG. 5, the IC chip 3 stores "image data" and "paper size" as image data read from the original document "original 1" and size data indicating a size of this original document "original 1", respectively. The IC chip 3 further stores "image data" and "paper size" as image data read from another original document "original 2" and size data indicating a size of the original document "original 2".

These data are read when the copying apparatus 1 executes the N-up turning back process, and then the read data are utilized in a printing process.

It should be understood that the image data stored in the IC chip 3 contains data, which designates a size when this image data is printed.

[IC Chip 3/IC Chip IF 28]

Figure 6:
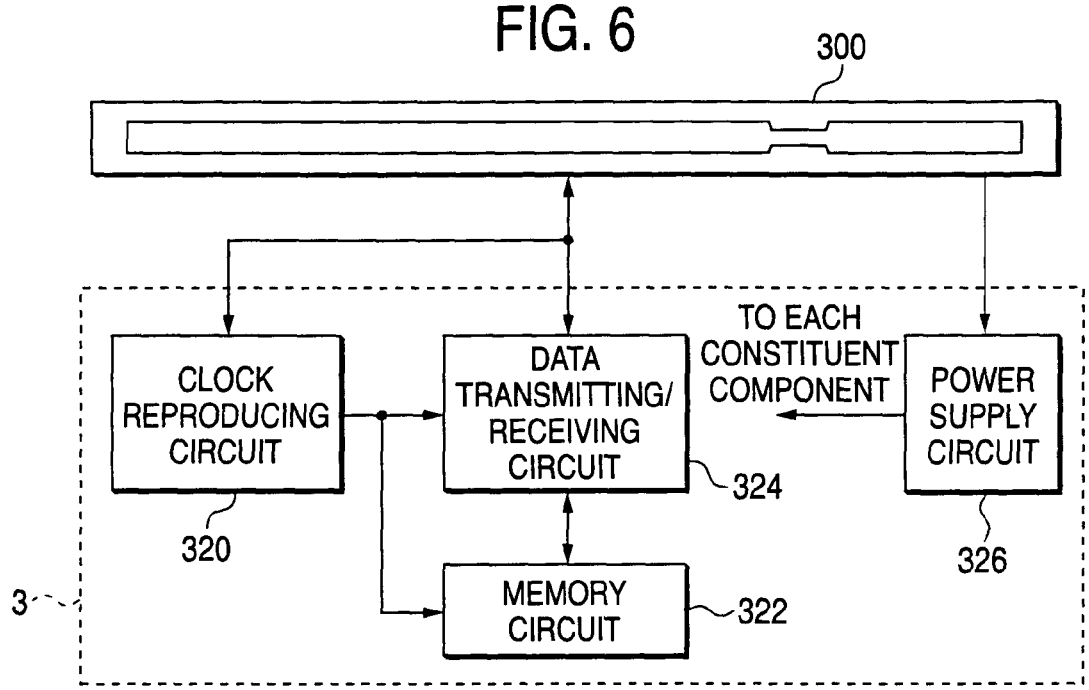
FIG. 6 is a diagram for showing a structure of the IC chip indicated in FIG. 3B and FIG. 4A.

FIG. 6 is a diagram for schematically showing a structure of the IC chip 3 shown in FIGS. 3B and 4A.

Figure 7:
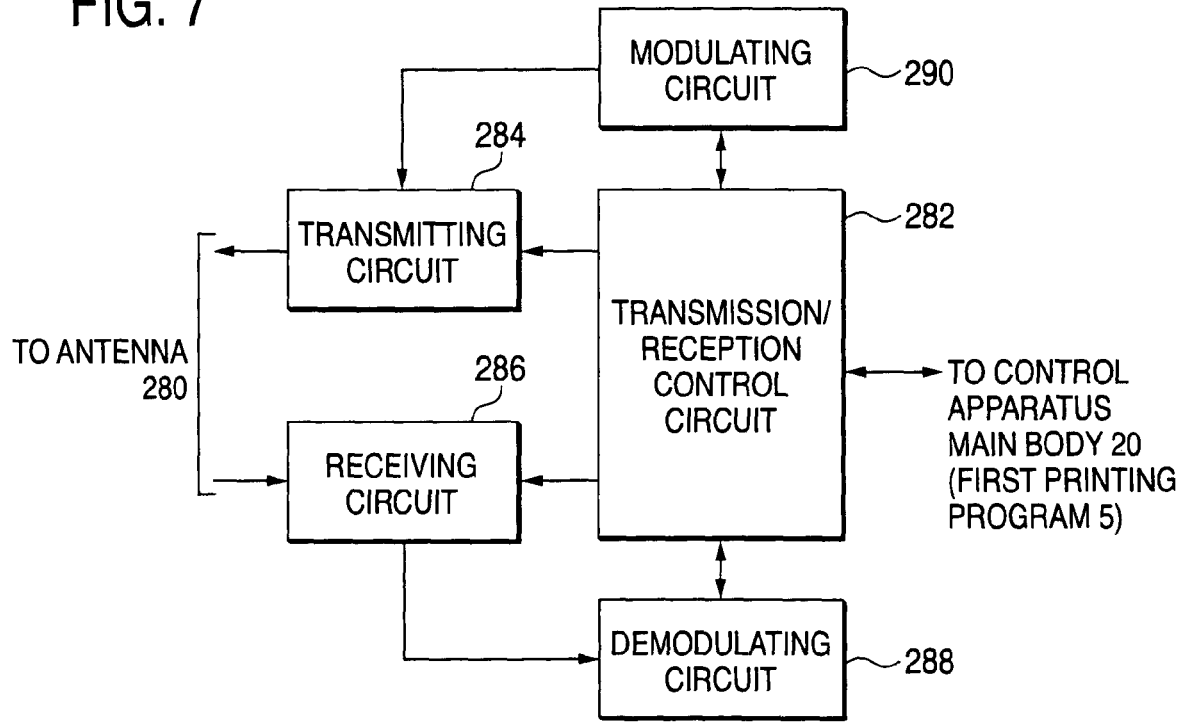
FIG. 7 is a diagram for indicating a structure of an IC chip IF shown in FIGS. 1 and 2.

FIG. 7 is a diagram for schematically showing a structure of the IC chip IF 28 shown in FIGS. 1 and 2.

As shown in FIG. 6, the IC chip 3 includes an antenna 300, a clock reproducing circuit 320, a memory circuit 322, a data transmitting/receiving circuit 324, and a power supply circuit 326.

It should also be noted that when it is so guaranteed that the IC chip 3 of the first original paper 40 passes through an area in close proximity to the antenna 280, an IC chip 3 having no antenna 300 may be employed.

Also, as shown in FIG. 7, the IC chip IF 28 includes a transmitting circuit 284, a receiving circuit 286, a transmission/reception control circuit 282, a demodulating circuit 288, and a modulating circuit 290.

In accordance with the below-mentioned operations of the each constituent component of the IC chip 3 and the IC chip IF 28, information (data) is written into the IC chip 3 via the IC chip IF 28 in a non-contact manner, and further, information (data), which has been stored in the IC chip 3, is read therefrom via the IC chip IF 28 in a non-contact manner.

In the IC chip 3 (see FIG. 6), the power supply circuit 326 rectifies an electromagnetic wave signal supplied via the antenna 300 so as to supply electric power to each constituent component of the IC chip 3, while this electric power is required for these structural units.

The clock reproducing circuit 320 reproduces a clock signal from the electromagnetic wave signal supplied via the antenna 300 from the IC chip IF 28 and then, outputs this reproduced clock signal to the memory circuit 322 and the data transmitting/receiving circuit 324.

The memory circuit 324 is, for example, a nonvolatile RAM (random access memory). This memory circuit 324 stores data indicating information, which is input from the data transmitting/receiving circuit 324 in synchronism with the clock signal input from the clock reproducing circuit 320.

Also, the memory circuit 322 outputs data indicating information stored therein to the data transmitting/receiving circuit 324 in synchronism with the clock signal.

The data transmitting/receiving circuit 324 demodulates the electromagnetic wave signal input from the antenna 300 into data and then, outputs this demodulated data to the memory circuit 322 in synchronism with the clock signal input from the clock reproducing circuit 320.

Also, the data transmitting/receiving circuit 324 changes a reflection intensity of the electromagnetic wave signal supplied from the IC chip IF 28 in accordance with a value of the data input from the memory circuit 322 in synchronism with the clock signal.

As described above, the data indicating the information, which has been stored in the memory circuit 322, is transmitted from the IC chip 3 to the IC chip IF 28 by changing the intensity of the reflection signal of the electromagnetic wave signal transmitted from the IC chip IF 28 to the IC chip 3.

In the IC chip IF 28 (FIG. 7), the transmission/reception control circuit 282 controls operations of each constituent component of this IC chip IF 28.

Also, this transmission/reception control circuit 282 outputs data input from the control apparatus main body 20 (namely, first printing program 5, which will be discussed later with reference to FIG. 8) to the modulating circuit 290.

Further, this transmission/reception control circuit 282 outputs data, which has been received by the receiving circuit 286 and then has been demodulated by the demodulating circuit 288, to the control apparatus main body 20.

The modulating circuit 290 modulates a high frequency signal (radio frequency signal) based upon data input from the transmission/reception control circuit 282 to produce an electromagnetic wave signal and then, outputs this produced electromagnetic wave signal to the transmitting circuit 284.

The transmitting circuit 284 transmits the electromagnetic wave signal via the antenna 280 to the IC chip 3. This electromagnetic wave signal contains data to be stored in the IC chip 3, and the clock signal.

The receiving circuit 286 receives a reflection signal, which is reflected from the IC chip 3, and then outputs this received reflection signal to the demodulating circuit 288.

The modulating circuit 288 demodulates the data transmitted from the IC chip 3 based upon a change of the reflection signal input from the receiving circuit 286 and then, outputs the demodulated data to the transmission/reception control circuit 282.

[First Printing Program 5]

FIG. 8 is a block diagram for schematically showing a structure of a first printing program 5, which is executed by the control apparatus 2 (see FIGS. 1 and 2) to realize the image forming method according to the invention.

As shown in FIG. 8, the first printing program 5 includes an image reading section 500, a user interface (UI) section 510, a data reading section 520, an image forming section 530, a data writing section 550, and a paper selecting section 560.

Also, the image reading section 500 contains an original-size specifying section 502. The image forming section 530 contains a size converting section 532, an integrating section 534, and a printing section 540.

When the N-up printing process is instructed, the first printing program 5 executes the N-up printing process to store image data of an original into the IC chip 3.

Also, when the N-up turning back process is instructed, the first printing program 5 executes the N-up turning back process in the following manner. The image data are read from the IC chip 3 and then, the read image data are printed in each original image size thereof.

The first printing program 5 is supplied via, for example, a recording medium 240 (FIG. 1) to the control apparatus 2, and then, is loaded to the memory 204 (FIG. 1) so as to be executed.

[Commonly-Used Function]

First, among the constituent components of the first printing program 5, sections, which are used in both the N-up printing process and the N-up turning back process, will now be explained.

In the first printing program 5, the UI section 510 receives an operation of a user with respect to the UI apparatus 26 (FIGS. 1 and 2), and then, outputs an instruction of either the N-up printing process or the N-up turning back process to either the image reading section 500 or the data reading section 520.

It should also be noted the following case is taken as a specific example. That is, when either the original document 44 or the first printing paper 40 is set to the original feeding apparatus 18 (FIG. 2) and either the N-up printing process or the N-up turning back process is instructed, the printing process is commenced.

In a case of the N-up printing process, the printing section 540 controls the print engine 14 to print image data input from the integrating section 534 on the first printing paper 40. In a case of the N-up turning back process, the printing section 540 controls the print engine 14 to print image data input from the data reading section 520 on the second printing paper 42.

[Functions in N-up Printing Process]

Next, a description will now be given on constituent components, which are mainly used in the N-up printing process.

In the first printing program 5, the image reading section 500 controls the constituent components of the copying apparatus main body 10 such as the scanner 16 (FIG. 2) to read an image (see FIG. 3A) of the original document 44, which is transported by the original feeding apparatus 18.

The original-size specifying section 502 specifies sizes of the original documents 44, which are sequentially transported, and then, outputs the specified sizes as size data to the data writing section 550.

For instance, the original-size specifying section 502 controls the scanner 16 (FIG. 2) to specify the sizes of the original documents 44 in an optical manner.

The size converting section 532 converts sizes of images input from the image reading section 500 in such a manner that all of the read images can be printed on a single sheet of the first printing paper 40.

For instance, when the 2-up printing process is carried out on the first printing paper 40 having the same size as the original document 44, the size converting section 532 compresses an area of an input image by a 1/2-compression ratio.

When two or more sheets of images are printed on a single sheet of the second printing paper 42, the integrating section 534 integrates the two or more sheets of input images with each other in a predetermined layout in response to shapes, sizes and total number of the input images, and further, in response to shapes and sizes of the first printing papers 40 on which these images are printed.

For instance, as shown in FIG. 3, when the images are read from two sheets of the A4-sized original documents and the read images are printed on the A4-sized printing paper, the integrating section 534 arranges the two sheets of images, which are compressed by the 1/2-compression ratio by the size converting section 532, to be longer edges thereof side by side as shown in FIG. 3B The data writing section 550 controls the IC chip IF 28 to write the image data input from the image reading section 500 into the IC chip 3 of the first printing paper 40, which has been selected and transported by a paper selecting section 560 (will be discussed later).

For instance, the data writing section 550 writes image data, which are read from two or more sheets of the original documents 44 as separate data files.

Furthermore, the data writing section 550 writes size data input from the original-size specifying section 502 into the IC chip 3.

[Functions in N-up Turning Back Process]

Finally, a description will now be given on constituent components, which are mainly used in the N-up turning back process.

In the first printing program 5, the data reading section 520 controls the IC chip IF 28 to read both image data and size data indicating a size of the original document 44 from the IC chip 3, and outputs. the read images data to the printing section 540, and also outputs the read size data to the paper selecting section 560.

The paper selecting section 560 controls the paper tray part 12 (FIG. 2) to select a second printing paper 42 corresponding to the size data input from the data reading section 520 and transports the selected second printing paper 42 to a printing position.

It should also be understood that in the N-up printing process, the paper selecting section 560 transports a first printing paper 40 selected by a user to the printing position.

[Overall Operation]

Next, overall operations of the copying apparatus 1 will now be described as to both the N-up printing process and the N-up turning back process.

FIG. 9 is a flow chart for describing a first operation (S10) of the copying apparatus 1 (first printing program 5) in the N-up printing process.

As shown in FIG. 9, in a step 100 (S100), a user sets two or more sheets of original documents 44 on the original feeding apparatus 18 (FIG. 2), and performs an operation for designating a size of the first printing paper 40 and the like with respect to the UI apparatus 26 (FIGS. 1 and 2).

The UI section 510 (FIG. 8) receives the operation and thus instructs the image reading section 500 and the like to carry out the N-up printing process.

In a step 102 (S102), when the N-up printing process is instructed with respect to the UI apparatus 26, the original feeding apparatus 18 (FIG. 2) sequentially transports two or more sheets of the original documents 44, which are set to the original feeding apparatus 18, to the image reading position, and the image reading section 500 (FIG. 8) controls the scanner 16 (FIG. 2) and the like to sequentially read images of two or more sheets of the original document 44, which are sequentially transported. Then, the image reading section 500 outputs the data of the read images to the size converting section 532 and the data writing section 550.

In a step 104 (S104), the original-size specifying section 502 (FIG. 8) specifies sizes of the original documents 44, which are sequentially transported, and then, outputs the specified sizes as size data to the data writing section 550.

In a step 106 (S106), the size converting section 532 compresses the two or more sheets of the images input from the image reading section 500 in such a manner that all of the plurality of images can be printed on a single sheet of the first printing paper 40, and then outputs the compressed images to the integrating section 534.

The integrating section 504 arranges two or more sheets of the compressed images side by side in such a way that all of the compressed images can be printed on a single sheet of the first printing paper 40, and then outputs the integrated image to the printing section 540.

In a step 108 (S108), the printing section 540 (FIG. 8) controls the print engine 14 (FIG. 2) to print the integrated image, which is input from the integrating section 534, on the selected first printing paper 40.

In a step 110 (S110), the data writing section 550 writes the input image data and the input size data into the IC chip 3, which is attached to the first printing paper 40.

As described above, the copying apparatus 1 can print the images displayed on two or more sheets of the original documents 44 on a single sheet of the first printing paper 40 in the integration manner. Further, the copying apparatus 1 can store the data of each image displayed on the original document 44 into the IC chip 3 of this first printing paper 40.

FIG. 10 is a flow chart for describing a first operation (S20) of the copying apparatus (first printing program 5) in the N-up turning back process.

As shown in FIG. 10, in a step 200 (S200), the user sets the first printing paper 40 on which two or more sheets of images have been printed in the N-up printing process shown in FIG. 9 on the original feeding apparatus 18 (FIG. 2), and performs an operation for instructing the N-up turning back process with respect to the UI apparatus 26 (FIGS. 1 and 2).

The UI section 510 (FIG. 8) receives this operation and thus instructs the image reading section 500 and the like to carry out the N-up turning back process.

In a step 202 (S202), when the N-up turning back process is instructed with respect to the UI apparatus 26, the data reading section 520 (FIG. 8) reads two or more pieces of the image data and of the size data from the IC chip 3 attached to the first printing paper 40, which is transported by the original feeding apparatus 18. Then the data reading section 520 outputs each read image data to the printing section 540, and also, outputs each read size data to the paper selecting section 560.

In a step 204 (S204), the paper selecting section 560 (FIG. 8) controls the paper tray part 12 (FIG. 2) to select a second printing paper 42 corresponding to the input size data, and then transports the selected second printing paper 42 to the printing position.

In a step 206 (S206), the printing section 540 (FIG. 8) prints two or more pieces of the image data input from the data reading section 520 on the second printing papers 42, which are sequentially transported.

In a step 208 (S208), the printing section 540 judges as to whether or not all of the image data have been printed.

When all of the image data have been printed, the first printing program 5 completes the N-up turning back process.

On the other hand, in other cases other than the above case, the first printing program 5 is advanced to a process of the step S204.

In other words, when two or more pieces of the image data are read, the first printing program 5 prints each image data on the second printing papers 42, which are separately provided.

As described above, since the copying apparatus 1 reads the image data and size data of the original from the IC chip 3 attached to the first printing paper 40, the copying apparatus 1 can print two or more pieces of the images, which have been integrated with each other to be printed on a single sheet of the first printing paper 40, on the second printing papers 42 in the same image sizes as those of the original documents.

Second Embodiment

Next, a second embodiment of the invention will be described.

In the second embodiment, the IC chip 3 attached to the first printing paper 40 (FIGS. 3B and 4A) does not store the image data of the images printed on the first printing paper 40, but store layout data indicating each of positions of two or more sheets of the images, which are printed on the first printing paper 40.

Also, the copying apparatus 1 (FIGS. 1 and 2) divides the images read from the first printing paper 40 in accordance with this layout data, and restores each of sizes of the divided images to print the restored images.

FIG. 11 is a diagram for showing an example of layout data, which is stored in the IC chip 3 shown in FIGS. 3B and 4A.

As shown in FIG. 11, the IC chip 3 attached to the first printing paper 40 stores the layout data (X:50, Y:25, 50, 75), size data (paper size), and magnification data (compression magnification power). The layout data represents boundary positions of two or more sheets of images, which are printed on this first printing paper 40. The size data shows a size of the original document 44 (FIG. 3A). The magnification data indicates magnification power at which the image of the original document 44 is compressed when the original document 44 is printed in the N-up printing process.

In this example, the layout data "X:50" indicates that the boundary of the images is present at a position of "X=50" in an X axis, which is determined based upon the positions of the shorter edge and the longer edge of the first printing paper 40 and the position of the IC chip 3. Similarly, the layout data "Y:25, 50, 75" shows that the boundary of the images at positions of "Y=25, 50, and 75" in a Y axis of the first printing paper 40.

Figure 12:
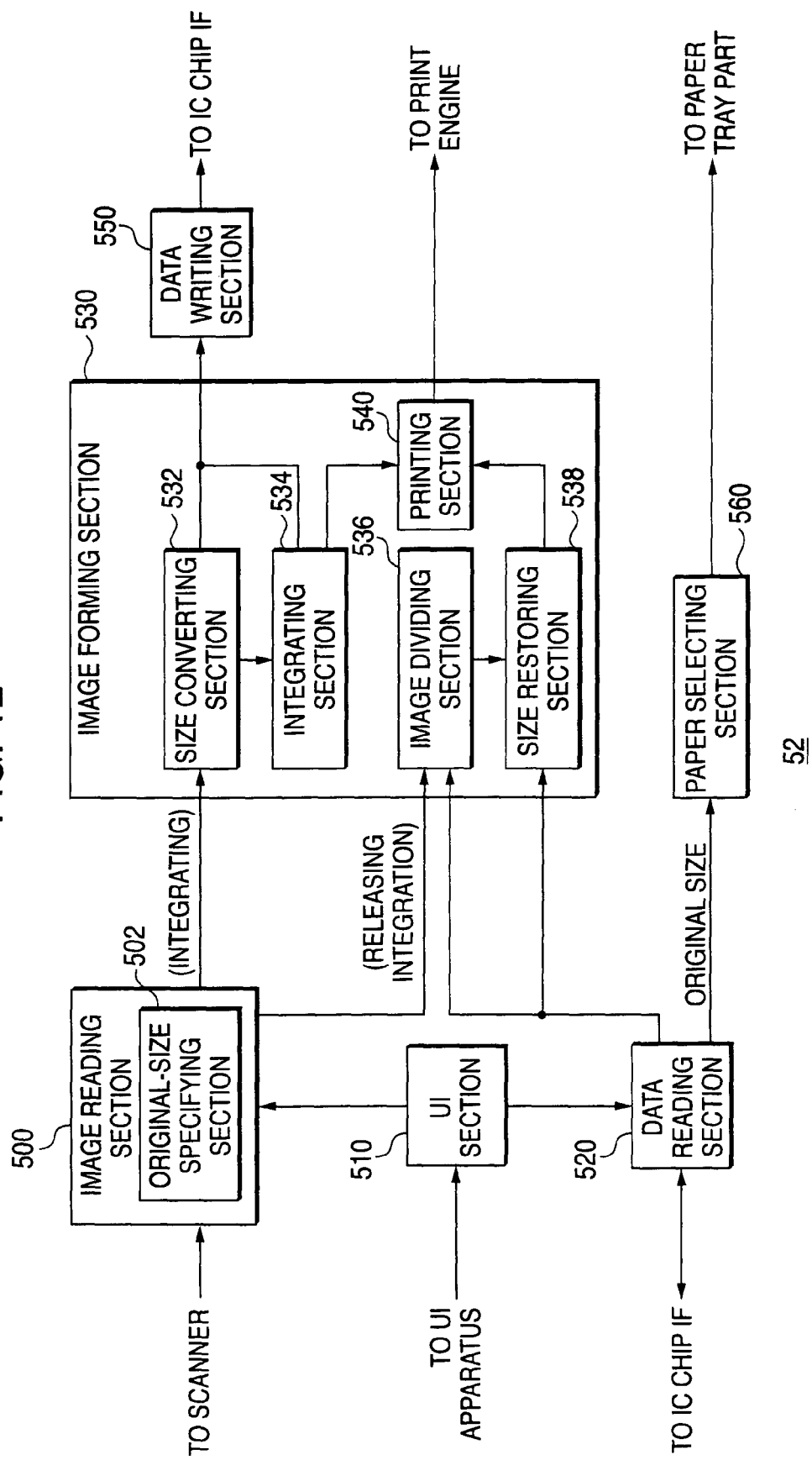
FIG. 12 is a diagram for indicating a structure of a second printing program 52.

FIG. 12 is a diagram for showing a structure of a second printing program 52.

As shown in FIG. 12, the second printing program 52 employs a structure in which an image dividing section 536 and a size restoring section 538 are additionally provided in the image forming section 530 of the first printing program 5 shown in FIG. 8.

It should also be noted that each constituent component of the second printing program 52, which is substantially same as that of the first printing program 5, is allotted the same reference numeral.

[Changed Point of Functions in N-up Printing Process]

First, a description will be given on a changed point of functions in the N-up printing process.

When a size of an image is converted, the size converting section 530 of the second printing program 52 outputs the magnification data indicating converted magnification power to the data writing section 550.

Also, the integrating section 534 arranges two or more sheets of images side by side to integrate these images with each other in order that the two or more sheets of these images can be printed on a single sheet of the first printing paper 40. Then, the integrating section 534 outputs the layout data indicating a boundary position of these images to the data writing section 550.

The data writing section 550 stores both magnification data and the layout data into the IC chip 3 in addition to the size data input from the original-size specifying section 502.

[Changed Point of Functions in N-up Turning Back Process]

Next, a description will be given on a changed point of functions in the N-up turning back process.

The data reading section 520 of the second printing program 52 reads the layout data, the size data, and the magnification data from the IC chip 3 of the first printing paper 40, which is transported from the original feeding apparatus 18 (FIG. 2). Then, the data reading section 520 outputs the layout data to the image dividing section 536, outputs the magnification data to the size restoring section 538, and outputs the size data to the paper selecting section 560, respectively.

Also, in the case of the N-up turning back process, the image reading section 500 reads the image on the first printing paper 40 transported from the original feeding apparatus 18 (FIG. 2), and then, outputs the read image to the image dividing section 536.

The image dividing section 536 divides the image input from the image reading section 500 in accordance with the layout data.

The size restoring section 538 enlarges the divided images by employing the magnification power indicated in the magnification data up to such sizes obtained before these sizes are compressed by the N-up printing process, and then outputs the enlarged images to the printing section 540.

Figure 13:
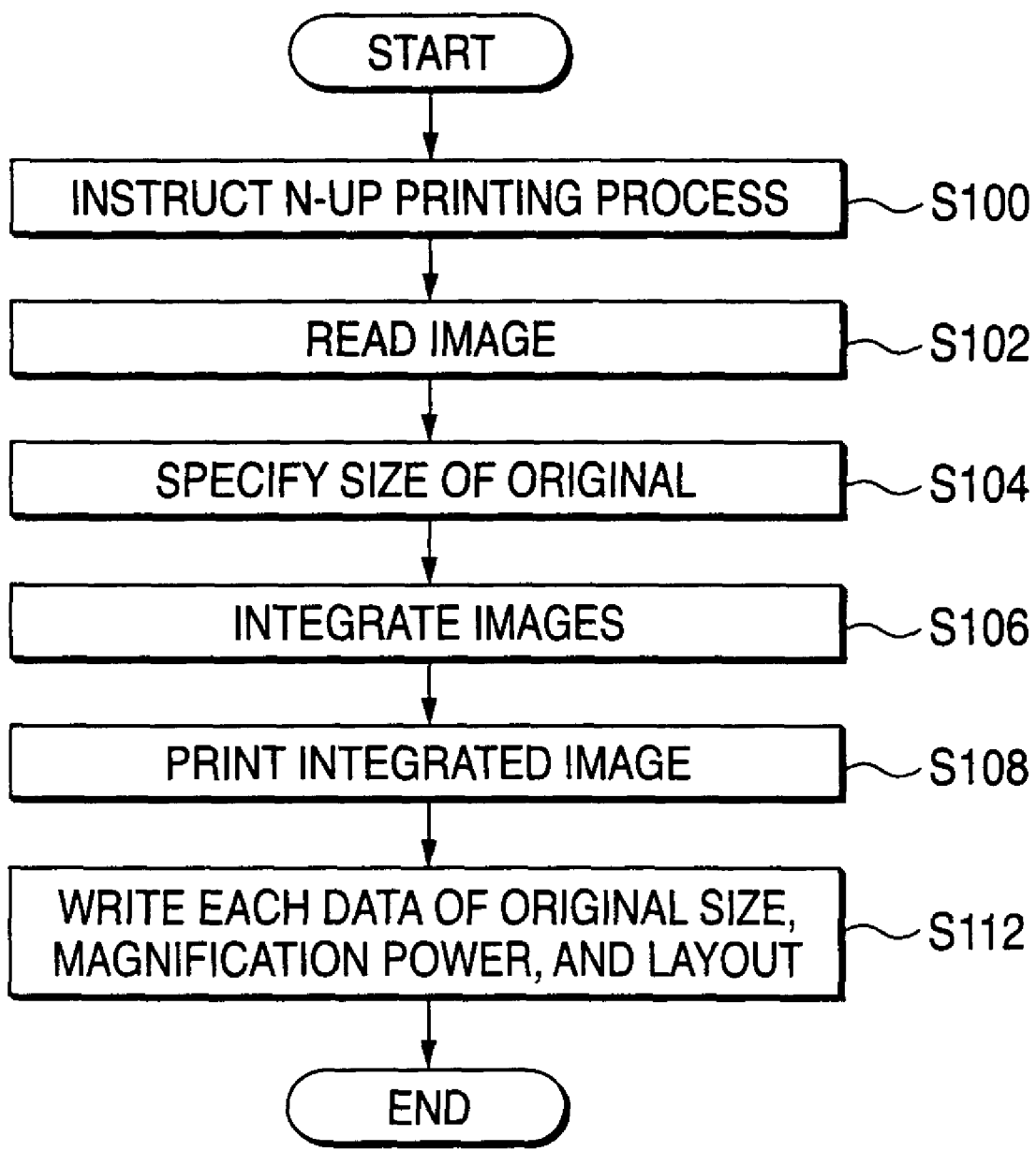
FIG. 13 is a flow chart for describing a second operation (S12) of the copying apparatus (second printing program 52) in the N-up printing process.

FIG. 13 is a flow chart for describing a second operation (S12) of the copying apparatus 1 (second printing program 52) in the N-up printing process.

Figure 14:
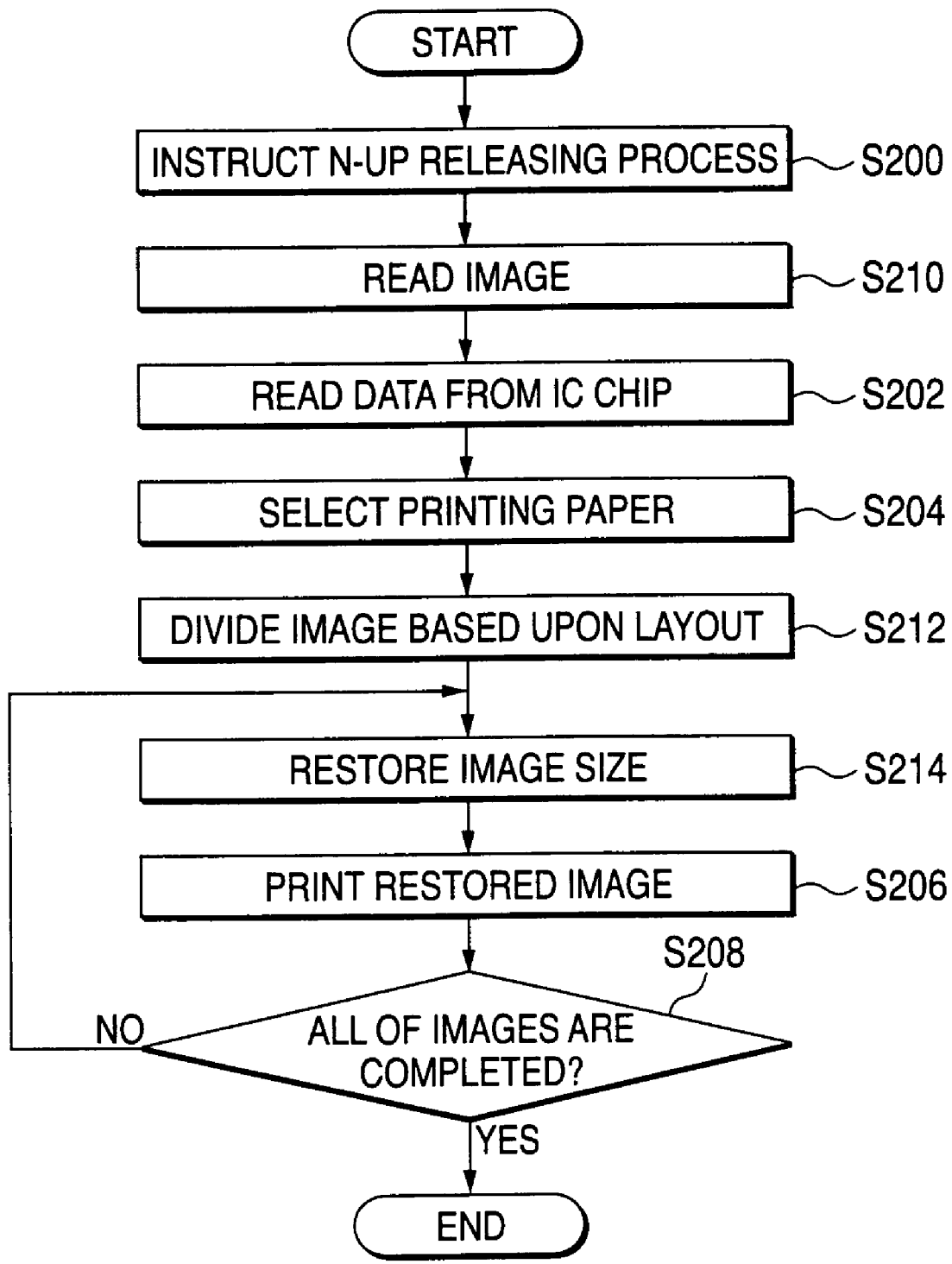
FIG. 14 is a flow chart for explaining a second operation (S22) of the copying apparatus (second printing program 52) in the N-up turning back process.

FIG. 14 is a flow chart for describing second operation (S22) of the copying apparatus 1 (second printing program 52) in the N-up turning back process.

It should also be noted that processes shown in FIGS. 13 and 14, which are substantially same as those of FIGS. 9 and 10, are allotted the same reference numerals.

[Second Operation in N-up Printing Process]

As shown in FIG. 13, in the second operation (S12) of the copying apparatus 1 in the N-up printing process, in a process of a step S106, images read from two or more sheets of original documents 44 are compressed to be integrated with each other. In a process of a step S108, the integrated image is printed. Thereafter, in a process of a step 112 (S112), the data writing section 550 (FIG. 12) stores the magnification data indicating the compression magnification power of the images and the layout data indicating the boundary position of the integrated image into the IC chip 3 in addition to the size data of the original document 44.

[Second Operation in N-up Turning Back Process]

As shown in FIG. 14, in the second operation (S22) of the copying apparatus 1 in the N-up turning back process, in a process of a step S202, the size data, the magnification data, and the layout data are read. In a process of a step S204, a second printing paper 42 corresponding to the read size data is selected. Thereafter, in a process of a step 212 (S212), the image dividing section 536 (FIG. 12) divides an image, which is read from the first printing paper 40, at a boundary position indicated by the read layout data, and then outputs the divided images to the size restoring section 538.

In a process of a step 214 (S214), the size restoring section 538 (FIG. 12) enlarges the sizes of the images, which are input from the image dividing section 536, to the original sizes thereof based upon the compression magnification power indicated by the magnification data, and then outputs the size-enlarged images to the printing section 540.

As described above, since not image data itself, but the layout data, the size data, and the compression magnification data are stored in the IC chip 3, this second embodiment is suitable for a case in which the storage capacity of the IC chip 3 is small.

[First Modification]

In the second embodiment, while the layout data has been stored in the IC chip 3 attached to the first printing paper 40, the image is divided based upon this stored layout data. In this first modification, while total number of printed images has been stored into the IC chip 3 attached to the first printing paper 40, the images read from this first printing paper 40 are equally divided in accordance with the total number of the images to reproduce an original.

Also, a case in which the original document 44 and the first printing paper 40 follows the paper size standard such as A3, A4, B3 and B4 will now be explained as a specific example.

Figures 15A, 15B:
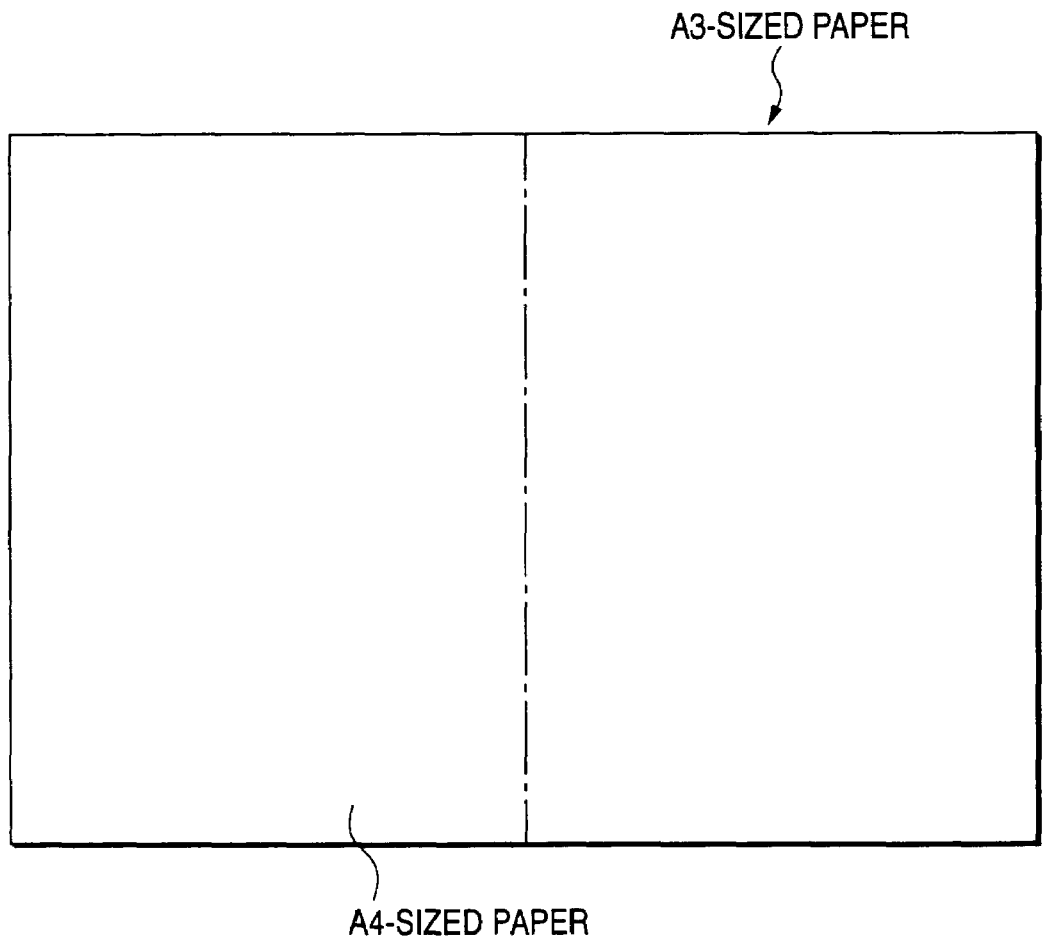
FIG. 15A is a diagram for exemplifying standards of the papers (original documents and printing papers) shown in FIG. 3.
FIG. 15B is a diagram for exemplifying sizes and shapes between an A3-sized paper and an A4-sized paper indicated in FIG. 15A.

FIG. 15A is a diagram for showing an example of a size standard of the papers (namely, the original document 44 and first printing paper 40) shown in FIG. 3. FIG. 15B is a diagram for showing sizes and shapes of the A3-sized paper and the A4-sized paper, which are shown in FIG. 15A.

As shown in FIG. 15A, a paper having the A3-standard owns an area two times larger than that of a paper having the A4-standard, and further owns an area four times larger than that of a paper having the A5-standard.

As shown in FIG. 15B, the size and the shape of this paper having the A3-standard are identical to a size and a shape of a paper, which are defined by arranging two sheets of papers having the A4-standard side by side in such a manner that longer edges of these papers are located adjacent to each other.

In other words, when two sheets of A4-sized images are arranged side by side to be printed on a paper having the A3-standard, these images are printed on each area, which is vertically divided by half with respect to a longer edge of this A3-sized paper.

As described above, when the original document 44 and the first printing paper 40 follows such a standard, layouts and compression magnification power at a time of the N-up printing process can be previously defined.

Figure 16:
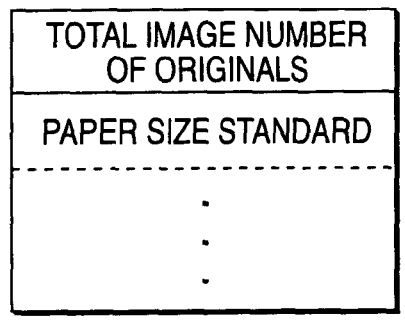
FIG. 16 is a diagram for exemplifying total sheet data and the like, which are stored in the IC chip shown in FIG. 4A.

FIG. 16 is a diagram for showing an example of total number data, which is stored in the IC chip 3 shown in FIGS. 3B and 4A.

As shown in FIG. 16, the IC chip 3 (FIGS. 3B and 4A) attached to the first printing paper 40 stores "total image number of originals" indicating total sheet of original documents 44, and paper size standards of the original documents 44. These original documents 44 correspond to sources of images, which are printed on this first printing paper 40.

[Changed Points of Functions]

In this modification, the original-size specifying section 502 shown in FIG. 12 specifies a paper size standard of the original document 44, and then, outputs this specified paper size standard as size data via the size converting section 530 to the data writing section 550.

In the N-up printing process, the size converting section 530 (FIG. 12) converts sizes of images based on an area ratio every paper size standard shown in FIG. 15A in a magnification power in response to total number of the original documents 44, paper size standards of the original documents 44, and the paper size standard of the first printing paper 40.

The integrating section 534 determines a layout as shown in FIG. 15B in response to the sizes of the images, which have been enlarged or compressed by the size converting section 530, and the paper size standard of the first printing paper 40.

The data writing section 550 writes the total number data and the paper size standard of the original document 44 into the IC chip 3 of the first printing paper 40. This total number data indicates total number of images printed on a single sheet of first printing paper 40.

It should also be noted that when the total number of images to be printed is not equal to two raised to the power of an integer, the size converting section 530 and the data writing section 550 process a multiplication by using two raised to the power of an integer, which is larger than the total number of images to be printed and is most approximated to the total number, as the total number data.

For example, when the total number of original documents 44 is equal to 3, the copying apparatus 1 processes the original documents 44 under such an assumption that the total number of images to be printed is equal to 4.

In the N-up turning back process, the data reading section 520 (FIG. 12) reads the total number data and the paper size standard from the IC chip 3 of the first printing paper 40.

The image dividing section 536 equally divides the image input from the image reading section 500 based on the total number specified by the total number data.

For instance, the image dividing section 536 repeatedly divides a read image into half in a vertical direction with respect to a longer edge of the read image until the total number of the divided images becomes equal to the total number specified by the total number data.

The size restoring section 538 restores the sizes of the divided images in response to the paper size standard of the original document 44.

Figure 17:
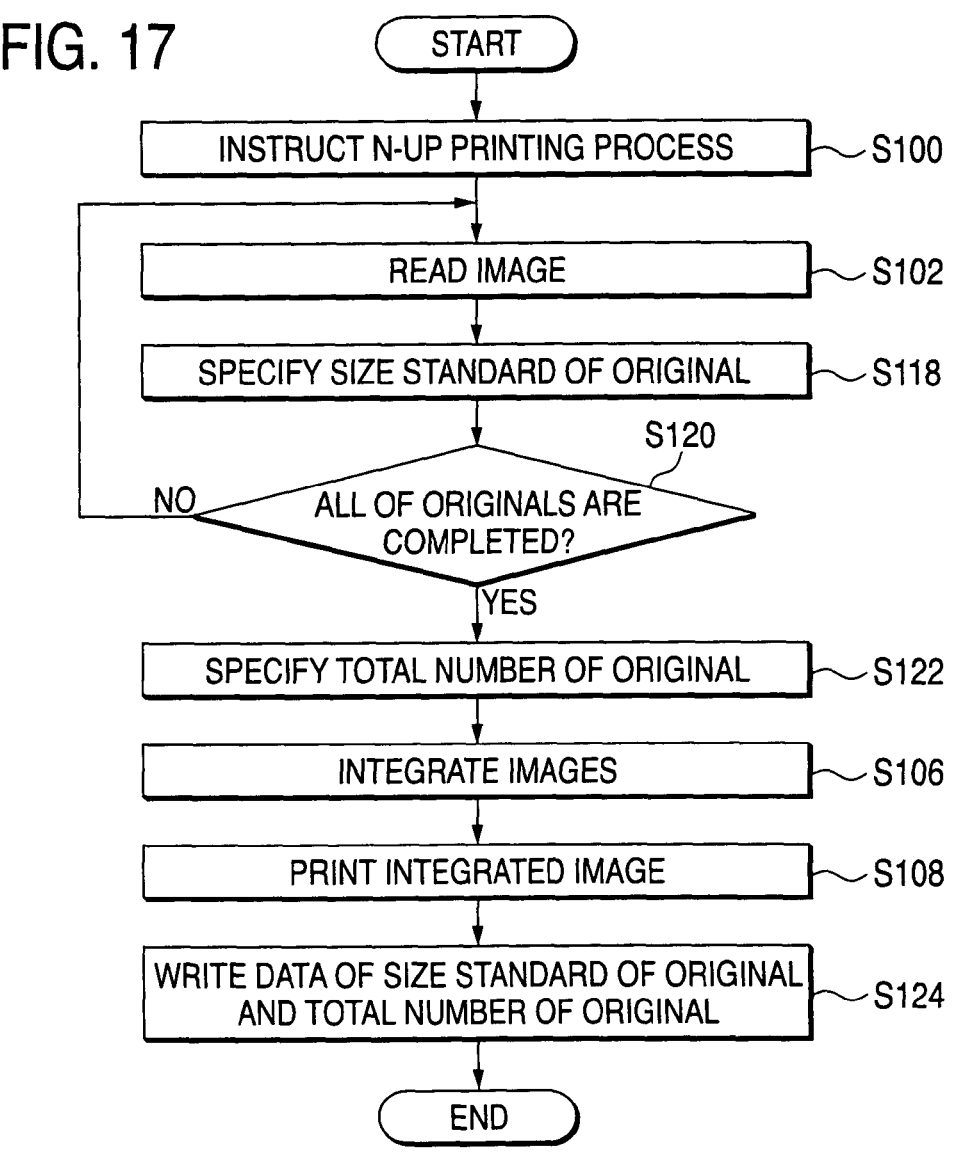
FIG. 17 is a flow chart for describing a third operation (S14) of the copying apparatus (second printing program 52) in the N-up printing process.

FIG. 17 is a flow chart for describing a third operation (S14) of the copying apparatus 1 (second printing program 52) in the N-up printing process.

Figure 18:
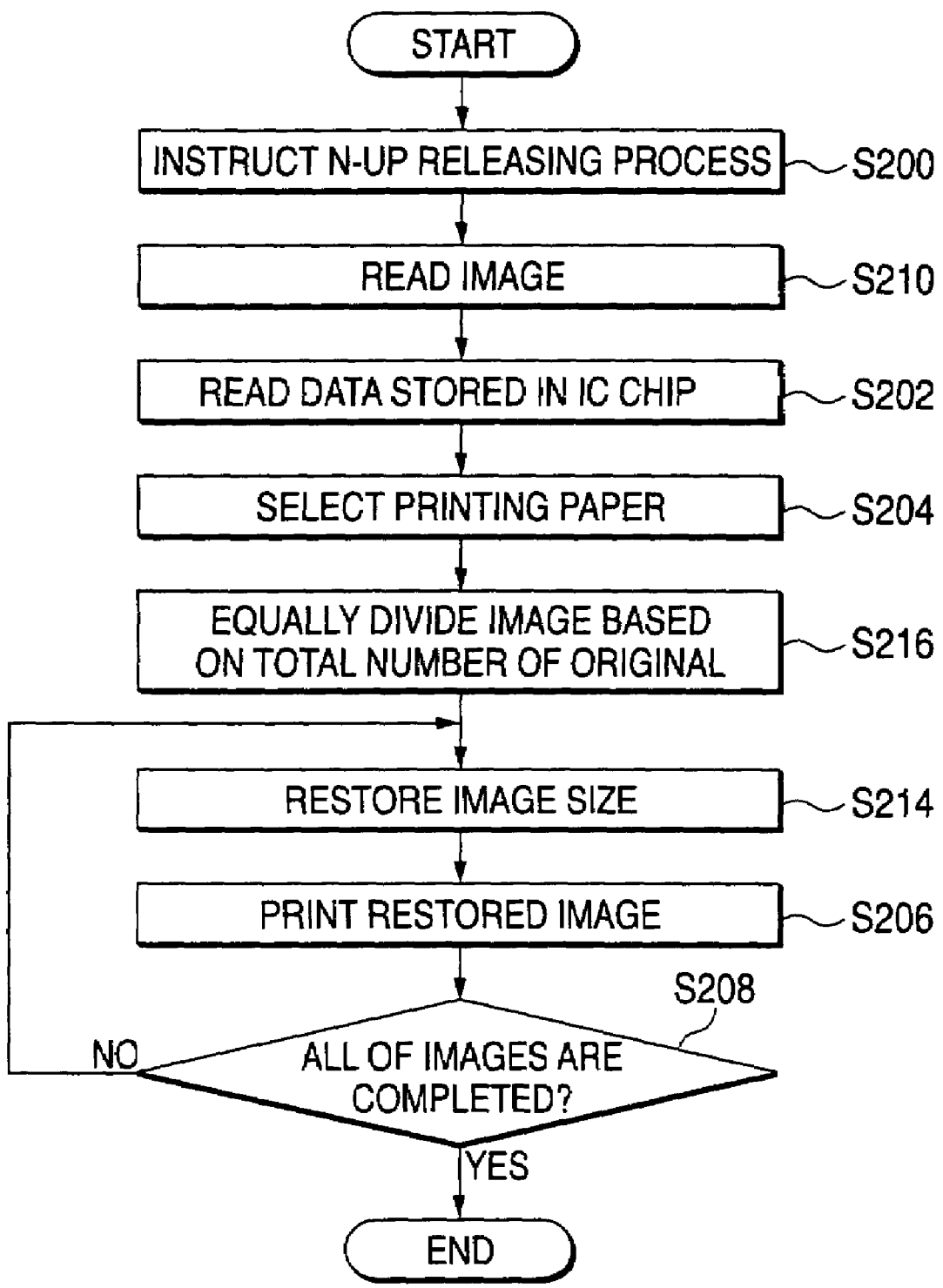
FIG. 18 is a flow chart for explaining a third operation (S24) of the copying apparatus (second printing program 52) in the N-up turning back process.

FIG. 18 is a flow chart for describing a third operation (S24) of the copying apparatus 1 (second printing program 52) in the N-up turning back process.

It should also be noted that steps in FIGS. 17 and 18, which are substantially same as those in FIGS. 13 and 14, are allotted the same reference numerals.

[Third Operation in N-up Printing Process]

As shown in FIG. 17, in the third operation (S14) of the copying apparatus 1 in the N-up printing process, each image is read from a single sheet of original document 44 in a process of a step S102. Thereafter, in a process of a step 118 (S118), the original-size specifying section 502 (FIG. 12) specifies a paper size standard of the original document 44, and then, outputs this specified paper size as size data to the size converting section 532.

The second printing program 52 judges as to whether or not all of the original documents 44 set to the original feeding apparatus 18 (FIG. 2) have been transported. When all of the set original documents 44 have been transported the second printing program 52 is advanced to a process of a step S122, whereas in other cases than this case, the second printing program 52 is advanced to another process of a step S102.

In other words, the second printing program 52 reads the images from all of the original documents 44 set to the original feeding apparatus 18 to specify each of paper size standards of the original documents 44.

In a step 122 (S122), the image reading section 500 (FIG. 12) counts total reading time of the images, and then outputs the counted value as total sheet data via the size converting section 532 to the data writing section 550.

In a step 124 (S124), the data writing section 550 (FIG. 12) writes the total sheet data and the size data into the IC chip 3 of the first printing paper 400.

[Third Operation in N-up Turning Back Process]

As shown in FIG. 18, in the third operation (S24) of the copying apparatus 1 in the N-up turning back process, the size data and the total sheet data are read in a process of a step S202. After the second printing paper 42 corresponding to the size data has been selected in a process of a step S204, the image dividing section 536 (FIG. 12) equally divides an image read from the first printing paper 40 in response to the read total sheet number, and then outputs the equally-divided images to the size restoring section 538.

As described above, since the total sheet data is stored into the IC chip 3 instead of the layout data, this first modification is suitable for such a case where the storage capacity of the IC chip 3 is further small.

Also, since both the original document 44 and the first printing paper 40, which are fitted to the paper size standard, are employed, the copying apparatus 1 can easily execute the determining process of the compression magnification power and the determining process of the layout of the image in the N-up printing process.

[Second Modification]

In the first embodiment, when the integration turning back process is instructed, all of the image data have been printed by performing the N-up turning back process, but alternatively, only image data selected by an user may be printed.

In this alternative case, the copying apparatus 1 displays printable image data (namely, one or more pieces of image data read from the IC chip 3) on the UI apparatus 26, and then receives a selection made by the user.

Figure 19:
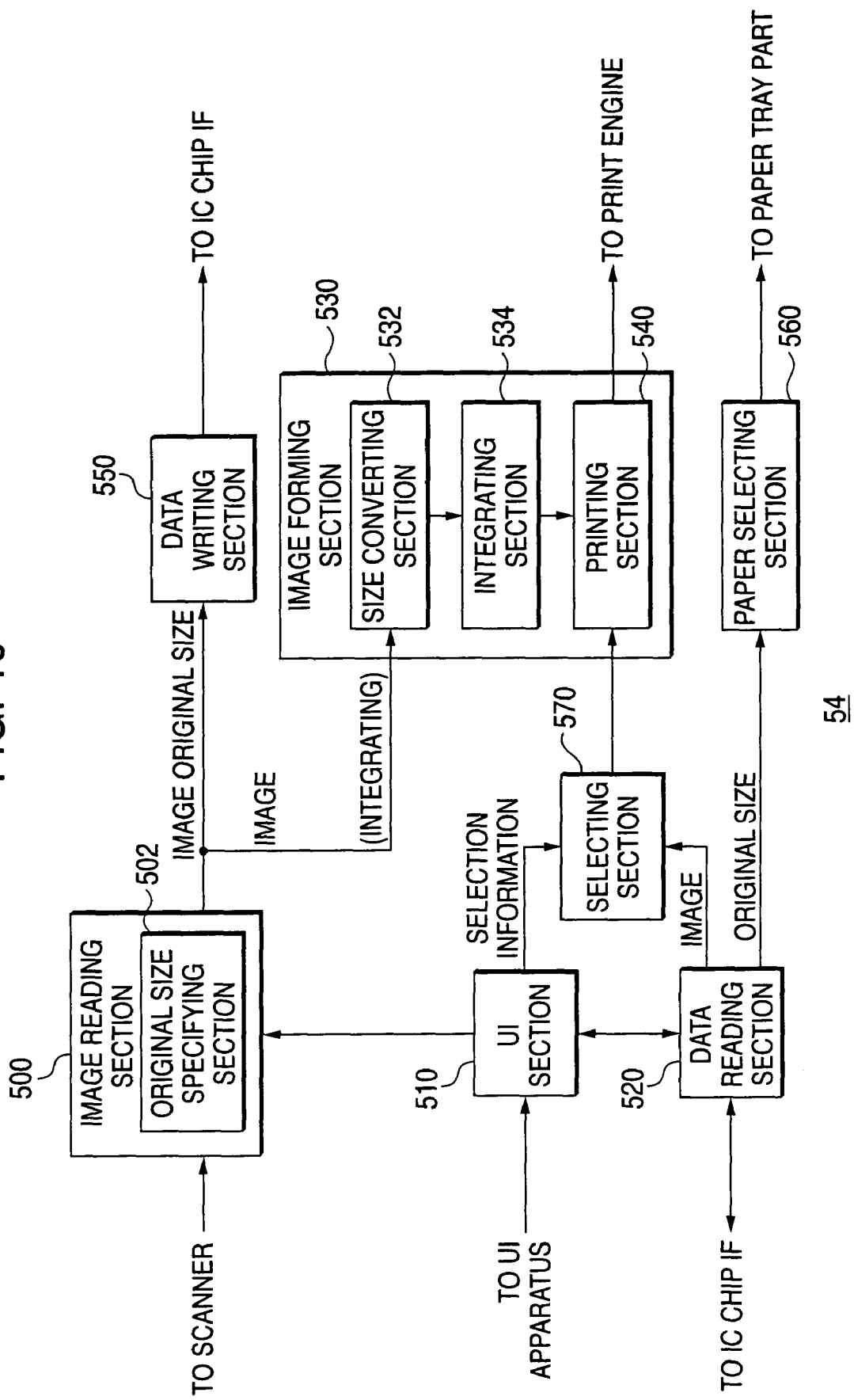
FIG. 19 is a diagram for showing an arrangement of a third printing program 54 in the second embodiment.

FIG. 19 is a diagram for showing a structure of a third printing program 54 in this second modification.

As shown in FIG. 19, the third printing program 54 employs such a structure that a selecting section 570 is additionally provided between the data reading section 520 and the printing section 540 in the first printing program 5 shown in FIG. 8.

It should be understood that constituent components of the third printing program 54, which are substantially same as those of the first printing program, are allotted the same reference numeral.

In the third printing program 54, the UI section 510 (display device) displays at least one piece of image data read by the data reading section 520 on the UI apparatus (FIGS. 1 and 2), and then, receives a selecting operation of the image data.

When the UI section 510 (selection reception device) receives the selecting operation of the image data, the UI section 510 outputs identification information of the selected image data as selection information to the selecting section 570.

When the image data is input from the data reading section 520 and the selecting information is input from the UI section 510 to the selecting section 570, the selecting section 570 outputs image data (namely, image selected by user) corresponding to the selecting information to the printing section 540.

In this case, the printing section 540 prints the image of the image data input from the selecting section 570.

Figure 20:
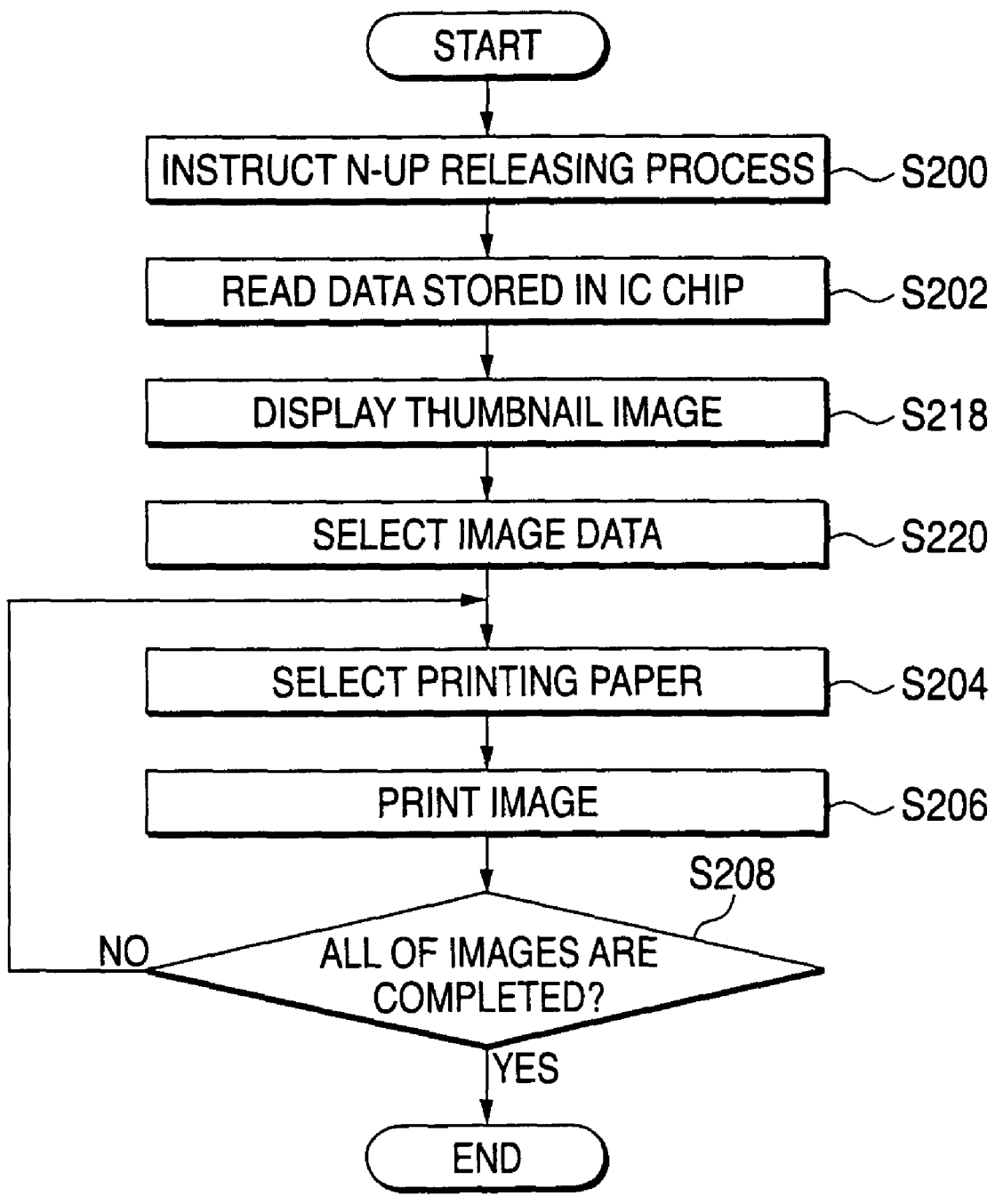
FIG. 20 is a flow chart for explaining a fourth operation (S26) of the copying apparatus 1 (third printing program 54) in the N-up turning back process.

FIG. 20 is a flow chart for describing an operation (S26) of the copying apparatus 1 (third printing program 54) in the N-up turning back process.

It should be understood that steps in FIG. 20, which are substantially same as those in FIG. 10, are allotted the same reference numerals.

As shown in FIG. 20, in a step S202, the data reading section 520 reads a plurality of image data from the IC chip 3, and then, outputs the read plural image data to the UI section 510 and the selecting section 570.

In a step 218 (S218), when the image data is input from the data reading section 520 to the UI section 510, the UI section 510 controls the UI apparatus 26 (FIGS. 1 and 2) to display images in a thumbnail display format, and thus allows the user to select a desirable image.

In a step 220 (S220), when the UI section 510 receives the selecting operation of the user, the UI section 510 outputs information indicating the selected image data to the selecting section 570.

The selecting section 570 outputs the image data selected by the user to the printing section 540 based on the selecting information input from the UI section 510.

Thereafter, the copying apparatus 1 prints the image data input to the printing section 540 by executing the processes from the step S204 to the step S208 shown in FIG. 10.

Figure 21:
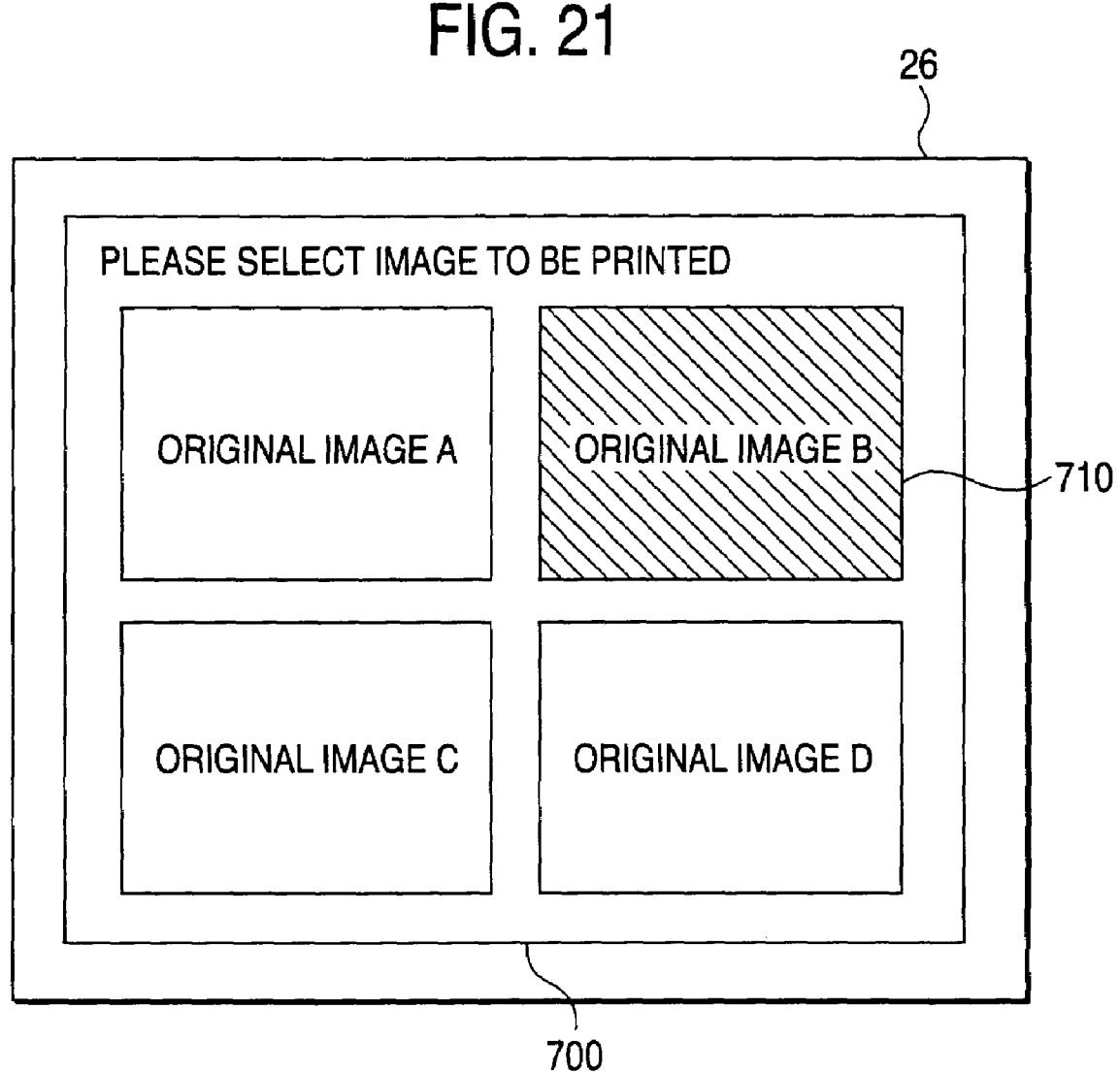
FIG. 21 is a diagram for exemplifying a thumbnail display screen 700.

FIG. 21 is a diagram showing an example of a thumbnail display screen.

As shown in FIG. 21, when at least one of image data is read by the data reading section 520, the UI apparatus 26 displays thereon a thumbnail image of the read image data.

This thumbnail image implies a low-resolution image that resolution of image data (this resolution is used for printing operation) read by the data reading section 520 is converted into resolution capable of being sufficiently previewed on a monitor.

The UI apparatus 26 of this second modification displays thereon a plurality of read image data in a list form by arranging the read images side by side, and then receives the selecting operation of the image data to be printed.

In response to the selecting operation of the user, the UI apparatus 26 inverts light/dark image portions of the thumbnail images, and displays a non-selected image 710, which is not selected by the user, in a dark display mode.

As described above, when the copying apparatus 1 of this second modification turns back the N-up printing state, the copying apparatus 1 displays the image data read from the IC chip 3 to preview these images, and can print the selected image data.

As a result, the user can previously select the image data, which is wanted to be printed, and then can print only the necessary image.

In this second modification, the thumbnail image can be displayed and the image to be outputted can be selected on the screen in the N-up turning back process. Alternatively, when the N-up printing operation is carried out, the thumbnail image may be displayed and the data to be written may be selected.

Concretely speaking, while the copying apparatus 1 displays one or more pieces of image data read from the original, this copying apparatus 1 may receive the selecting operation of the user and then may write the selected image data into the IC chip 3.

As described above, in accordance with the image forming system and the image forming method of the invention, while utilizing the semiconductor chip from which the data stored thereinto can be read in the non-contact manner, two or more sheets of images, which have been formed by being once integrated with each other, can be again separated to be formed.

What is claimed is:

1. An image forming system comprising:
    a first image forming member having a data storage unit and a data supply unit;
    a second image forming member being different from the first image member; and
    an image forming apparatus for forming an image on at least the first image forming member, wherein:
    the image forming apparatus includes:
        an image reading unit for reading a plurality of images, which are printed on originals, respectively, to form plural pieces of image data indicating the read images, respectively;
        a merging unit for merging the plurality of images into a single combined image;
        an image forming unit for forming the combined image on the single first image forming member;
        a data writing unit;
        a data reading unit; and
        a selecting unit,
    the data writing unit writes, into the data storage unit of the first image forming member, the plural pieces of image data, which indicate the images read by the image reading unit,
    the data reading unit reads the plural pieces of image data, which indicate the respective images and are supplied from a data supply unit of the first image forming member on which the combined image has been formed,
    the selecting unit receives an operation to select at least one of the plural pieces of image data read by the data reading unit, and
    the image forming unit forms the image indicated by the selected image data on the second image forming member.

2. The image forming system according to claim 1, wherein the second image forming member includes another storage unit configured to store data and another data supply unit configured to supply the data stored in said another storage unit.

3. The image forming system according to claim 1, wherein the second image forming member includes no storage unit configured to store data.

4. An image forming apparatus comprising:
    an image reading unit for reading a plurality of images, which are printed on originals, respectively, to form plural pieces of image data indicating the read images, respectively;
    a merging unit for merging the plurality of images into a single combined image;
    an image forming unit for forming the combined image on a single first image forming member;
    a data writing unit;
    a data reading unit; and
    a selecting unit, wherein
    the data writing unit writes, into a data storage unit of the first image forming member, the plural pieces of image data, which indicate the images read by the image reading unit,
    the data reading unit reads the plural pieces of image data, which indicate the respective images and are supplied from a data supply unit of the first image forming member on which the combined image has been formed, the selecting unit receives an operation to select at least one of the plural pieces of image data read by the data reading unit, and the image forming unit forms the image indicated by the selected image data on a second image forming member being different from the first forming member.

5. The image forming apparatus according to claim 4, further comprising:

a display unit for displaying at least one image using the image data read by the data reading unit.

6. The image forming apparatus according to claim 4, wherein the second image forming member includes another storage unit configured to store data and another data supply unit configured to supply the data stored in said another storage unit.

7. The image forming apparatus according to claim 4, wherein the second image forming member includes no storage unit configured to store data.

8. An image forming method comprising:

reading a plurality of images, which are printed on originals, respectively, to form plural pieces of image data indicating the read images, respectively;

combining the read images into a combined image;

forming the combined image on a single first image forming member; and writing the plural pieces of image data indicating the read images in the combined image formed on the single first image forming member into the first image forming member;

reading the plural pieces of image data, which indicate the respective images and are supplied from a data supply unit of the first image forming member on which the combined image is formed;

selecting at least one of the read plural pieces of image data; and forming a selected image indicated by the selected image data on a second image forming member being different from the first image forming member.

9. A computer-readable medium storing a program causing a computer to perform an image forming process, the process comprising:

reading a plurality of images, which are printed on originals, respectively, to form plural pieces of image data indicating the read images, respectively;

combining the read images into a combined image;

forming the combined image on a single first image forming member;

writing the plural pieces of image data indicating the read images in the combined image formed on the single first image forming member into the first image forming member;

reading the plural pieces of image data, which indicate the respective images and are supplied from a data supply unit of the first image forming member on which the combined image is formed;

selecting at least one of the read plural pieces of image data; and forming a selected image indicated by the selected image data on a second image forming member being different from the first image forming member.

* * * * *